(12) United States Patent
Boyer et al.

(10) Patent No.: US 8,059,028 B2
(45) Date of Patent: Nov. 15, 2011

(54) HYBRID GNSS AND TDOA WIRELESS LOCATION SYSTEM

(75) Inventors: Pete A. Boyer, Chesterbrook, PA (US);
Ronald LeFever, Lansdale, PA (US);
Rashidus S. Mia, Phoenixville, PA (US); Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 611 days.

(21) Appl. No.: 12/192,057

(22) Filed: Aug. 14, 2008

(65) Prior Publication Data

US 2010/0039320 A1 Feb. 18, 2010

(51) Int. Cl.
*G01S 19/46* (2010.01)
(52) U.S. Cl. .................................................. 342/357.29
(58) Field of Classification Search ... 342/357.2–357.78
See application file for complete search history.

(56) References Cited

U.S. PATENT DOCUMENTS

| | | | | |
|---|---|---|---|---|
| 4,445,118 | A | 4/1984 | Taylor et al. | 342/357.09 |
| 5,327,144 | A | 7/1994 | Stilp et al. | 342/387 |
| 5,608,410 | A | 3/1997 | Stilp et al. | 342/387 |
| 6,188,354 | B1 | 2/2001 | Soliman et al. | 342/387 |
| 6,289,280 | B1 | 9/2001 | Fernandez-Corbaton et al. | 701/214 |
| 6,859,172 | B2 | 2/2005 | Powers et al. | |
| 6,919,842 | B2 | 7/2005 | Cho | 342/357.06 |
| 7,271,765 | B2 | 9/2007 | Stilp et al. | |
| 2005/0148346 | A1 | 7/2005 | Maloney | 455/456.1 |
| 2006/0074558 | A1 | 4/2006 | Williamson et al. | |
| 2008/0248811 | A1* | 10/2008 | Maloney et al. | 455/456.1 |
| 2008/0284646 | A1* | 11/2008 | Walley et al. | 342/357.09 |

(Continued)

OTHER PUBLICATIONS

PCT Notification of Transmittal of the International Search Report and the Written Opinion of the International Searching Authority mailed Sep. 30, 2009, issued in corresponding International Application No. PCT/US2009/053185.

(Continued)

*Primary Examiner* — Thomas Tarcza
*Assistant Examiner* — Nga X Nguyen
(74) *Attorney, Agent, or Firm* — Woodcock Washburn LLP

(57) ABSTRACT

A method and apparatus for position determination is provided using measurements from both Global Positioning System (GPS) receivers and terrestrial-based Uplink Time Difference of Arrival (UTDOA) receivers. The method involves the transformation of downlink satellite measurements into equivalent UTDOA measurements by computing comparable cross-correlation coefficients and time differences of arrival with respect to a UTDOA reference station. The method includes a weighting operation whereby the relative weights of the UTDOA measurements and the relative weights of the GPS measurements are adjusted based on a theoretical scaling followed by empirical adjustments. The method further involves the efficient computation and combining of metrics that are used to minimize the weighted error between candidate location solutions and the UTDOA and GPS measurements. This is done efficiently in two dimensions for UTDOA and in three dimensions for GPS measurements by increasing the complexity of searching operations as the optimal location solution is approached. A technique is also described that improves upon a particular location solution by changing the measurement weightings using criteria specific to GPS and UTDOA.

74 Claims, 15 Drawing Sheets

U.S. PATENT DOCUMENTS

2009/0213000 A1*  8/2009  Gross et al. ............... 342/357.03
2010/0097267 A1*  4/2010  Ho et al. ................... 342/357.02

OTHER PUBLICATIONS

Leick, A . . . , *GPS Satellite Survey*, $2^{nd}$ Ed., John Wiley & Sons, Inc., New York, 1995, 253-255.

McDonough, R. et al., *Detection of Signals in Noise*, $2^{nd}$ Ed., Academic Press., San Diego, CA, 1995, 404-417.

Parkinson, B.W. et al., "GPS Navigation Data," in *Global Positioning Systems: Theory and Applications*, vol. 1, American Institute of Aeronautics and Astronautics, Inc. Washington, DC, 1996, 123-126.

Thompson, R. et al., *Interferometry and Synthesis in Radio Astronomy*, John Wiley and Sons, 1986, 155-165, 213-214, 305-308.

Venables, W. et al., *Statistics and Computing; Modern Applied Statistics with S-PLUS*, Third Edition, Springer-Verlag, 1997, 122-129.

* cited by examiner

HYBRID GNSS AND TDOA WIRELESS LOCATION SYSTEM

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to a method for increasing the accuracy and yield of wireless location for wireless devices containing a Global Navigation Satellite System (GNSS) receiver within a network-based Wireless Location System.

BACKGROUND

A U-TDOA location system (and other location systems) location performance is normally expressed as one or more circular error probabilities. The United States Federal Communications Commission (FCC) as part of the Enhanced 9-1-1 Phase II mandate requires that network-based systems, such as U-TDOA, be deployed to yield a precision that generates a one-hundred meter (100 m or 328.1 feet) accuracy for 67% of emergency services callers and a three-hundred meter (300 m or 984.25 feet) accuracy for 95% of emergency services callers.

First commercially deployed in 1998, overlay network-based wireless location systems have been widely deployed in support of location-based services including emergency services location. As mobile usage increases, the need for high accuracy and high yield wireless location increases for both commercial location-based services and wireline parity for Enhanced 9-1-1.

An example of the need for a high accuracy, high yield wireless location system can be found in the Federal Communications Commission's 07-166 Report and Order released on Nov. 20, 2007. The 07-166 Order established an original deadline of Sep. 11, 2010, by which time all wireless carriers must demonstrate full E911 location accuracy compliance within at least 75% of the Public Safety Answering Points (PSAPs) they serve; and demonstrate compliance within 50% of location accuracy requirements in all of their PSAP service areas. The Order originally required carriers to achieve full compliance in all PSAPs they serve by Sep. 11, 2012.

To ensure that wireless carriers are making progress toward full PSAP-level compliance, the FCC has instituted a series of interim benchmarks requiring carriers to achieve location accuracy compliance within each Economic Area they serve by Sep. 11, 2008 and within progressively smaller geographic areas (including Metropolitan Statistical Areas and Rural Service Areas by Sep. 11, 2010) until they demonstrate full PSAP-level compliance in 2012. Wireless carriers must submit biennial progress reports (by Sep. 11, 2009 and 2011, respectively) to the FCC describing their progress toward achieving full PSAP-level compliance. Compliance was expected to be based on testing as detailed in the FCC Office of Engineering and Technology (OET) Bulletin No. 71 guidelines; however, the FCC declared in the 07-116 Report and Order that the FCC may define additional testing reporting requirements in the future.

The FCC 07-166 Report and Order has been stayed by the U.S. Court of Appeals for the District of Columbia Circuit and the timelines and deadlines proposed are in jeopardy, but the FCC was clear in its intent to enforce stricter requirements on wireless carriers' E911 systems.

The Commission's stated goal in enacting the new standards that was to allow public safety workers to better locate individuals who have called for emergency assistance from a wireless phone has not changed.

As the FCC moves towards a PSAP-level location accuracy (and yield) mandate, methods for combining different location technologies becomes a necessity. This invention is in the fields of communications and location technology. It provides a means for combining complementary technologies of GPS and UTDOA to achieve accuracy improvements.

GNSS receivers (examples of GNSS systems include the United State's NAVSTAR Global Positioning System and the Russian Federation's GLONASS system. Other examples of GNSS systems include the European Union's proposed Galileo system and the Chinese proposed Beidou Satellite Navigation and Positioning System) generally produce highly accurate pseudorange measurements but in urban environments satellite coverage can become severely limited. In urban environments, UTDOA has the advantage of having better coverage and more measurements but generally provides less accurate individual TDOA measurements. When there is sparse coverage for both systems, neither system may independently be capable of providing a location solution; however, when used together accurate location estimation becomes feasible.

A method and system is provided that efficiently utilizes measurements from both GPS and UTDOA networks to find the position of the mobile station (MS). The downlink pseudorange measurements in GPS are transformed into U-TDOAs and combined with other measurements. Satellites are treated as transmitting towers with very high antenna heights based on the satellite position at the time of the pseudorange measurement.

The inventive techniques and concepts described herein apply all Global Navigation Satellite Systems and to time and frequency division multiplexed (TDMA/FDMA) radio communications systems including the widely used IS-136 (TDMA), GSM, OFDM, and SC-FDMA wireless systems, as well as code-division radio communications systems such as CDMA (IS-95, IS-2000) and Universal Mobile Telecommunications System (UTMS), the latter of which is also known as W-CDMA. The Global System for Mobile Communications (GSM) model and the United States NAVSTAR Global Positioning System (GPS) discussed below are an exemplary but not exclusive environment in which the present invention may be used.

REFERENCES

The following references may be consulted for additional background relating to the subject matter described herein:
[1] B. W. Parkinson, J. J. Spilker, P. Axelrad, and P. Enge, "GPS Navigation Algorithms," in *Global Positioning Systems: Theory and Applications Volume 1*, American Institute of Aeronautics and Astronautics, Inc. Washington, D.C., 1996.
[2] A. Leick, *GPS Satellite Survey*, $2^{nd}$ Ed., John Wiley & Sons, Inc., New York, 1995.
[3] R. Thompson, J. Moran and G. Swenson, *Interferometry and Synthesis in Radio Astronomy*, John Wiley and Sons, 1986.
[4] R. McDonough, A. Whalen, *Detection of Signals in Noise*, $2^{nd}$ Ed., Academic Press., San Diego, Calif., 1995.
[5] W. Venables and B. Ripley, *Modern Applied Statistics with S-PLUS*, Springer-Verlag, 1997.

[6] Fernandex-Corbaton et al., "Method and apparatus for determining an algebraic solution to GPS terrestrial hybrid location system equations," U.S. Pat. No. 6,289,280, Sep. 11, 2001.
[7] J. Cho, "Hybrid navigation system using neural network," U.S. Pat. No. 6,919,842, Jul. 19, 2005.
[8] Soliman et al., "Method and apparatus for determining the location of a remote station in a CDMA communication network," U.S. Pat. No. 6,188,354, Feb. 13, 2001.
[9] U.S. Pat. No. 5,327,144; Stilp et al
[10] U.S. Pat. No. 5,608,410; Stilp et al
[11] U.S. patent application Ser. No. 10/748,367 Maloney et al
[12] U.S. Pat. No. 4,445,118; Taylor et al.

SUMMARY

As is well known to those skilled in the art of wireless location, measured TDOA values may be employed to determine the geographic location of a wireless transmitter. In the present invention, transformation of the GPS pseudoranges is performed for a given set of UTDOA measurements in order to achieve accurate combining of the measurement baselines for the two different technologies. Next, an initial weight of the GPS baselines is found as a function of measurement data followed by a refinement that optimizes the relative scaling of the GPS and UTDOA weights. An iterative process of searching and downweighting is then performed. The search process requires the combination of both types of measurements that includes solving for independent biases for each type of measurement. The search process also includes the computation of the vertical (Z) dimension which is necessary for GPS and not for UTDOA. Different downweighting operations are then performed to improve upon prior solutions. Finally, results from a Geometric Dilution of Precision (GDOP) calculation and a residual calculation provide input to a stopping condition that produces the final location solution.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problem and then a more detailed description of our solutions.

Figure 1:
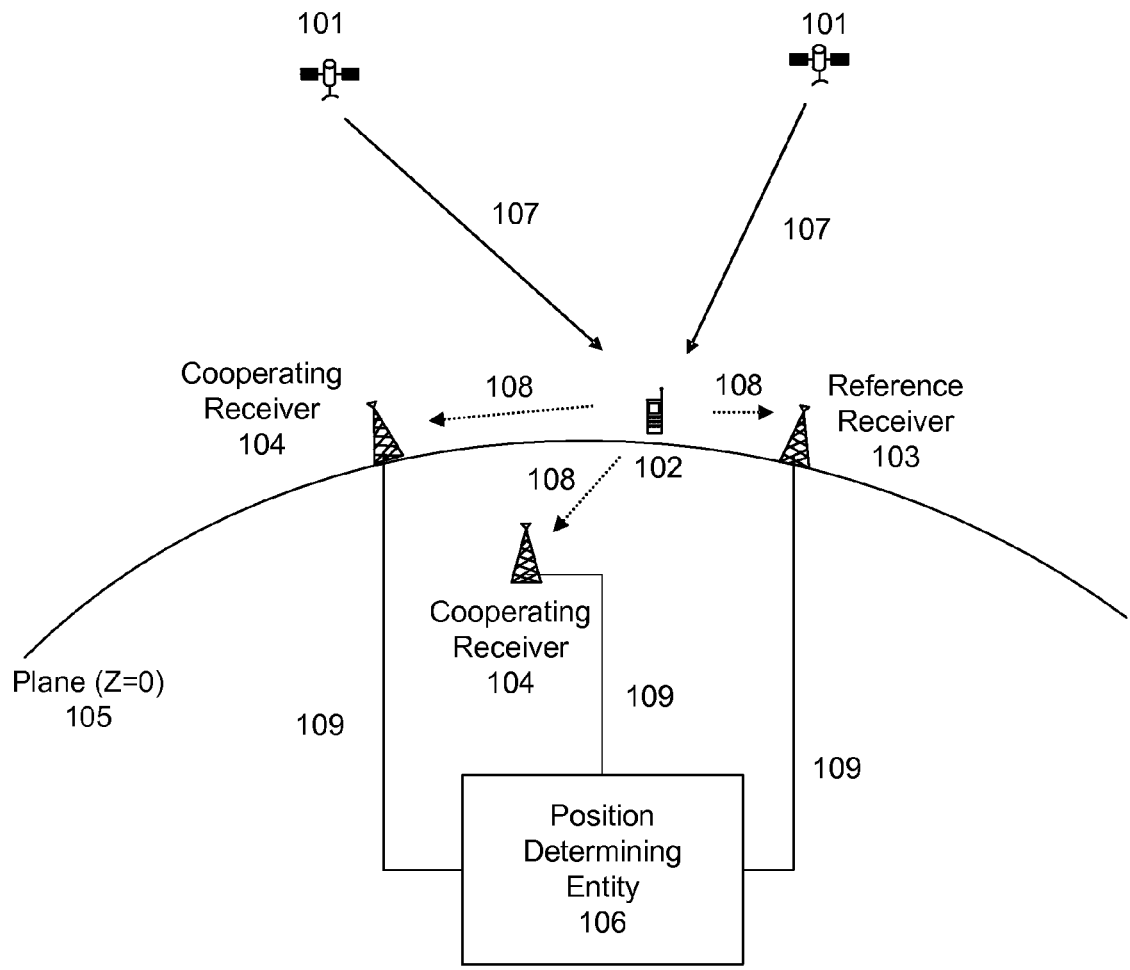
FIG. 1: Illustration of a hybrid GPS/UTDOA network.

FIG. 1 shows a U-TDOA, A-GPS hybrid wireless location system. For convenience, only the operative components of the wireless location system is shown, components such as middleware servers (examples include Mobile Positioning Center (MPC) or Global Mobile Positioning System (GMLC)) which handle administration, accounting, access control, and authorization services common to location-based services are not shown.

In FIG. 1, the GNSS constellation is represented by the two satellites 101 which transmit radio data streams 107 that include Almanac and Ephemeris Data in pre-established format that allow the GNSS receiver subsystem of the mobile device 102 to potentially self locate anywhere on the surface of Earth 105 with an estimate of the geodetic or ellipsoidal altitude. The radio transmission 107 containing the Almanac and Ephemeris Data is also received by the reference receiver 103 and the cooperating receivers 104 of the U-TDOA network.

The U-TDOA wireless location network consisting of the geographically distributed receivers 103 104, the Position Determining Entity (PDE) 106, and associated data networking 109 uses the mobile device 102 uplink transmissions 108 and the single time base provided by the GNSS constellation 101 radio transmissions 107 to detect the time-difference-of-arrival between the Reference Receiver 103 and the 1 or more Cooperating Receivers 104. The position estimate is then calculated using Multi-lateration, also known as hyperbolic positioning.

Figure 3:
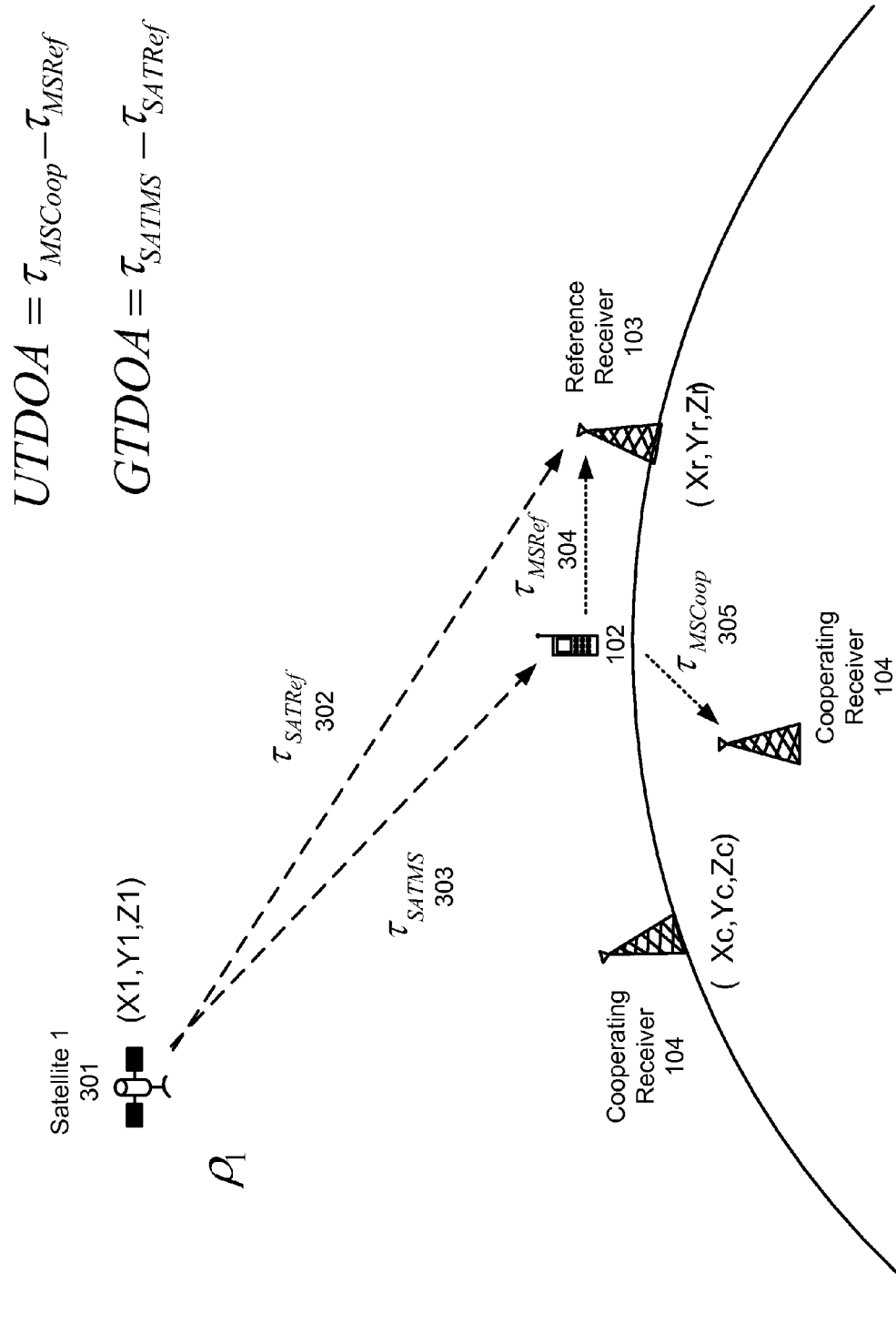
FIG. 3: Illustration of translation from GPS to UTDOA.

Transformation of GPS pseudoranges to UTDOAs:

Pseudoranges are compared with the geometric distances to a UTDOA reference station in order to compute a time difference of arrival between the UTDOA reference station and the measurement point at the MS. This is illustrated in FIG. 3 along with the components of a UTDOA measurement. As shown in FIG. 3, the satellite 301 position is known; (X1, Y1, Z1). The satellite 301 transmission is received at the mobile device 102 through satellite transmission path 303 and at the Reference Receiver 103 through satellite transmission path 302. The difference in time-of-arrival between the satellite signal received at the Mobile Device 102 and at the Reference Receiver 103 is the transformed time difference of arrival for a GPS TDOA (GTDOA). The difference in time-of-arrival between the Cooperating Receiver 104 through terrestrial radio path 305 and the Reference Receiver 103 through terrestrial radio path 304 is the measured UTDOA that is typical for UTDOA technologies.

The UTDOA measurement represents the difference in the time of arrival of the mobile signal at a cooperating base station and a reference base station. For the UTDOA measurement, the MS location is unknown and the reference base station and cooperating base station locations are known. For the calculated GTDOA, the role of the MS is changed. The MS is effectively a cooperator with unknown location receiving from the satellite with a known location. The role of the MS is changed and instead of having the unknown location at the transmitter and the known location at the cooperator, as in UTDOA, the unknown location is at the cooperator (the MS) and the known location is at the transmitter (the satellite). The reference tower serves as the same reference for both the UTDOA and the GTDOA. For GPS, the Line of Sight (LOS) propagation delay between the reference tower and the satellite can be calculated directly since the reference tower position is known and the satellite position can be calculated.

Figure 2:
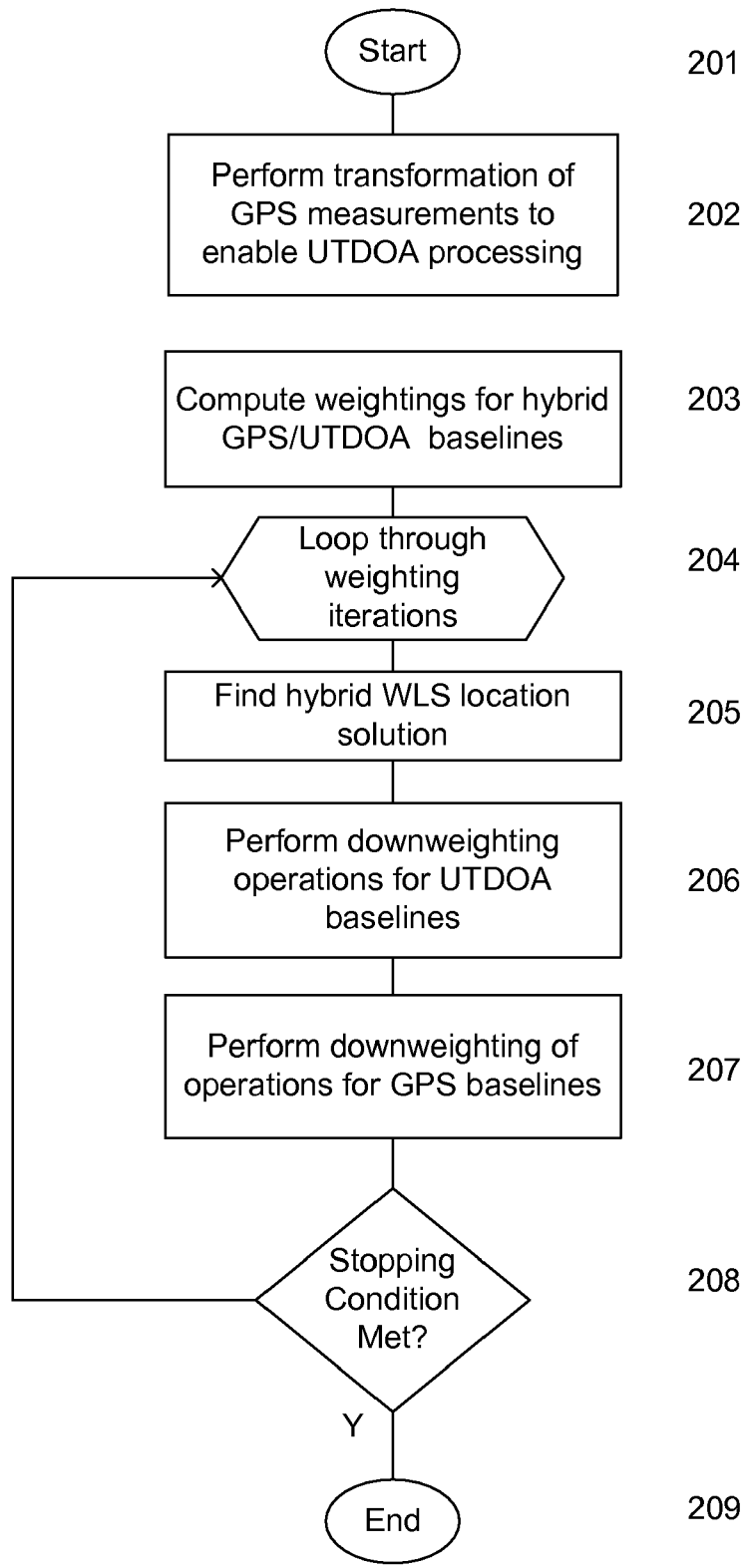
FIG. 2: Key processing stages for hybrid GPS/UTDOA process.

As shown in FIG. 2, key processing stages for hybrid GPS/UTDOA process include entry into the process 201. The GPS measurements are then 202 converted into TDOA ranges or baselines between the mobile device and the GPS/GNSS satellites 101. The PDE 106 then computes weightings for the hybrid GPS/U-TDOA baselines. Next the process becomes iterative and loops through the weighting iterations 204 until stopping conditions are met 208. Within the iterative loop, the hybrid position estimate is determined using the current baseline weighting 205 then a downweighting operation is performed for the U-TDOA baselines 206 and the GPS baselines 207. The iterative loop 204 continues until the pre-set stopping condition is met 208. The stopping condition occurs when the number of iterations exceeds a predetermined maximum or when the GDOP starts to exceed a predetermined threshold. When the former condition is met, the last location solution is the one that is returned. When the later condition is met, the location solution from the prior iteration is the one that is returned. The hybrid GPS/UTDOA process then ends 209, resulting in a hybrid position estimate.

Figure 4:
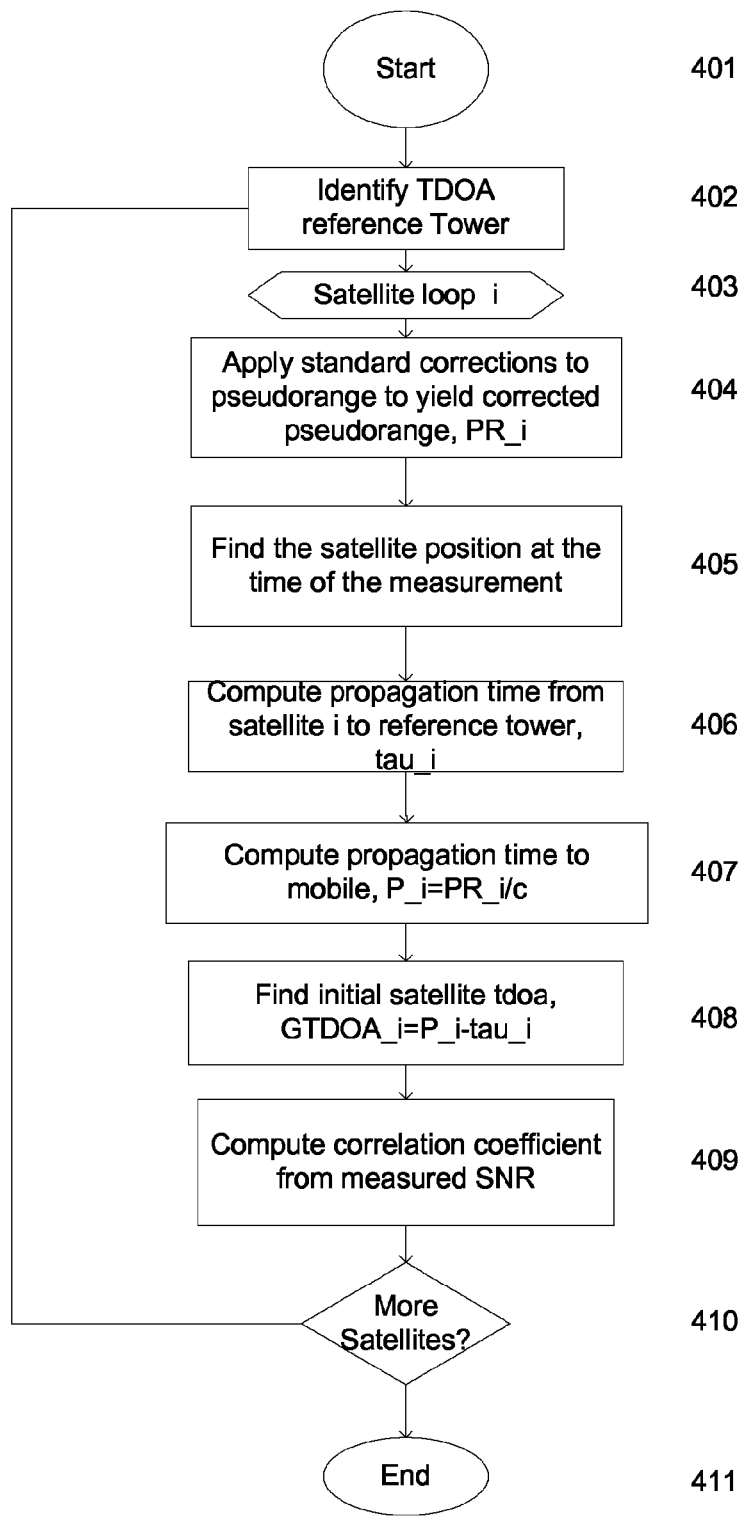
FIG. 4: Flow chart of translation from GPS to UTDOA.

The procedure for transforming the GPS parameters to TDOAs is depicted in FIG. 4. Once the procedure is entered 401, the TDOA reference tower is identified 402 and then the TDOAs are computed for each satellite 403. For each satellite 403, the position of the satellite is found and standard corrections 404 in [1] are made to the pseudoranges so that they reflect geometric distances 405. The propagation delay between the satellite and the reference tower is then computed 406. The measured propagation time between the satellite and the MS is then computed by dividing the corrected pseudorange by the speed of light 407. Note that there is still a receiver clock error bias in this propagation delay that must be removed as described later. The GPS TDOA is computed as the difference between the propagation delay from the satellite to the MS and the propagation delay from the satellite to the reference tower 408.

A correlation coefficient is then computed for the cross-correlation between the received pseudorandom noise (PRN) at the MS and the hypothetical reception of the PRN at the reference tower 409. If the signal-to-noise ratio (SNR) at the reference tower is large relative to the SNR at the MS (acting as the cooperator), then the following relationship exist between the SNR at the MS and the correlation coefficient for the ith pseudorange measurement [3]

$$SNR_i^{1/2} \approx \rho_i/(1-\rho_i^2)^{1/2}. \quad (1)$$

When the SNR at the cooperator (MS) is known, this equation is rearranged and the correlation coefficient for the GPS TDOA is $$\rho_i = 1/(1+1/SNR_i)^{1/2} \quad (2)$$

This provides a measure of quality of the pseudorange measurement that is comparable to cross-correlating the UTDOA cooperator and the reference signal measurement.

The procedure then loops for each satellite received by the mobile device until all satellites have been processed 410. The procedure then ends 411 returning a Weighting Procedures:

The pseudorange measurements are weighed based on the SNR reported by the GPS receiver. Since the weighting operations for GPS and UTDOA are performed for different technologies, differences in the resulting RMS error estimates are expected. As such, the GPS and UTDOA weights are scaled based on factors that include the measurement error distribution for UTDOA and GPS, the number GPS measurements available and the number of UTDOA measurements available.

Figure 5:
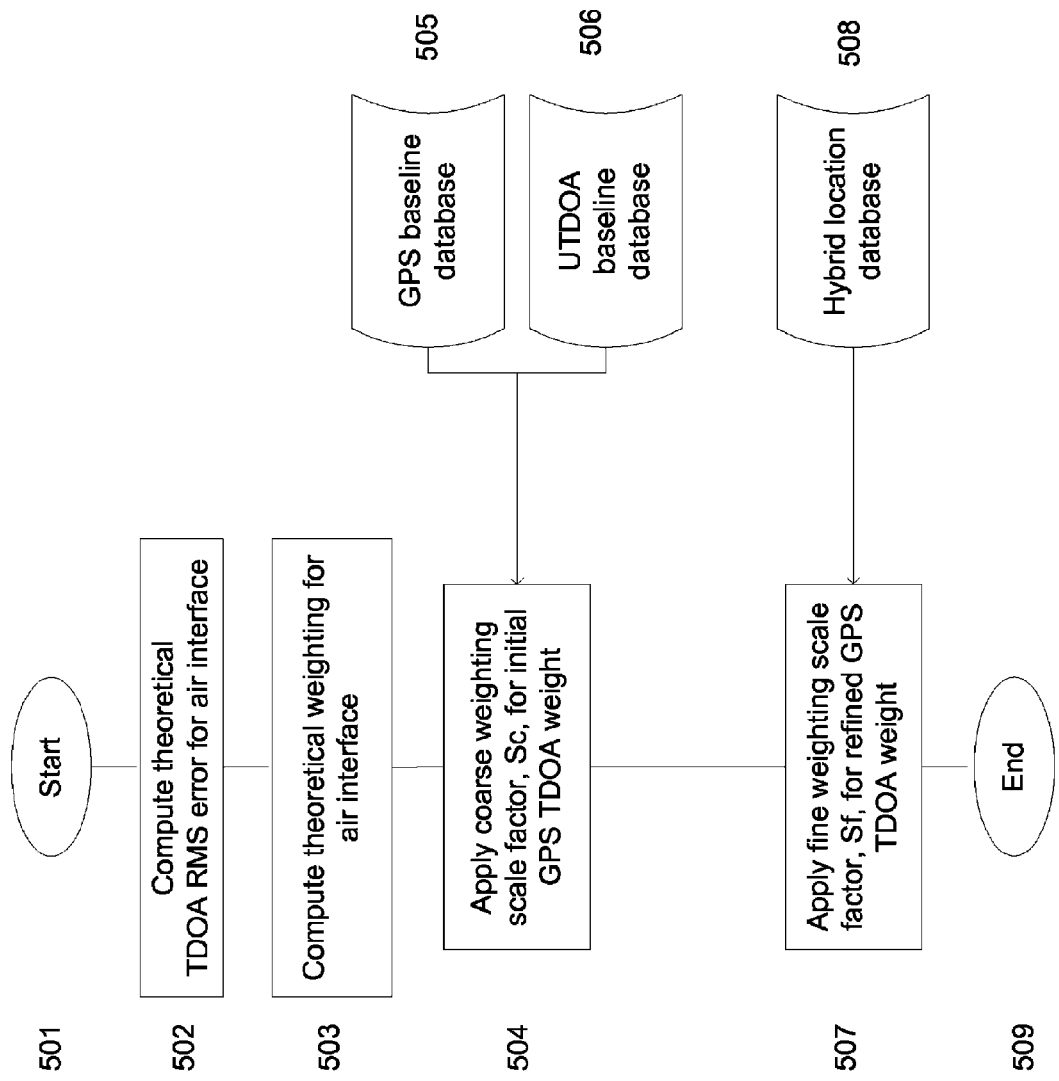
FIG. 5: Hybrid GPS/UTDOA scaling of baseline weights.

FIG. 5 illustrates the weighting procedure. Once entered 501, the procedure first computes an initial weighting based on the RMS error from the Cramer Rao bound [4] 502. The lower bound on the TDOA RMS error in Additive White Gaussian Noise (AWGN) is $$TDOA_{rms} = \frac{\sqrt{12}}{2\pi B(2BT)^{1/2}(SNR_i)^{1/2}} \quad (3)$$

where, B is the signal bandwidth and T is the coherent integration length. The bandwidth and integration length are specific to the air interface for the UTDOA detection. A theoretical TDOA RMS error based on the air interface, $aTDOA_{rms\_i}$, is computed for the each GPS baseline from (3) using the GPS SNR and the air interface parameters for the UTDOA measurements 503.

The UTDOA RMS error estimate can be enhanced to account for multipath effects. For example, the standard deviation of the UTDOA error due to multipath for the ith baseline with a GSM air interface is computed as $$\sigma_{M\_i} = \begin{cases} \dfrac{K_M}{\sqrt{SNR_i}} & SNR_i \leq SNR_{knee} \\ \dfrac{K_M}{\sqrt{SNR_i}} \sqrt{\dfrac{SNR_{knee}}{SNR_i}} & SNR_i > SNR_{knee} \end{cases} \quad (4)$$

where $K_M$ is empirically determined and $SNR_{knee}$ is the point where a more rapid drop off is desired. A similar term can be computed for other air interfaces such as WCDMA or CDMA2000.

The weight is one over the square of the contributions from noise and multipath, giving a theoretical weighting over the air interface of $$W_{ai} = \frac{1}{aTDOA_{rms\_i}^2 + \sigma_{M\_i}^2} \quad (5)$$

Next, this theoretical weighting is scaled using measurement data 504. A database of GPS-only baseline measurement errors 505 and UTDOA-only measurement errors 506 has been compiled from a large number of past GPS and UTDOA locations. The ratio of the RMS error averaged over each of these databases provides a coarse scaling factor, Sc, as $$S_c = \frac{UTDOA_{rms}^2}{GTDOA_{rms}^2} \quad (6)$$

where, $GTDOA_{rms}$ is the measured GPS RMS error and $UTDOA_{rms}$ is the measured UTDOA RMS error. This ratio is a constant computed offline. The initial weighting for each GPS baseline is then the product of the coarse scaling factor and the weight from the theoretical GPS TDOA as $$W_{gi} = \frac{UTDOA_{rms}^2}{GTDOA_{rms}^2} \frac{1}{aTDOA_{rms\_i}^2} = S_c W_{ai} \quad (7)$$

A fine scale factor, $S_f$, can then be computed 507 using hybrid GPS/UTDOA measurements. The final measurement weight is $$W_{Gi} = SW_{ai} \qquad (8)$$

where $S=S_f S_c$. The sensitivity of the hybrid solution to S can be computed offline for a database of hybrid location measurements 508.

The weighting procedure then exits 509, returning the weighting factor that provides the minimum location error for the hybrid technique.

Figure 6:
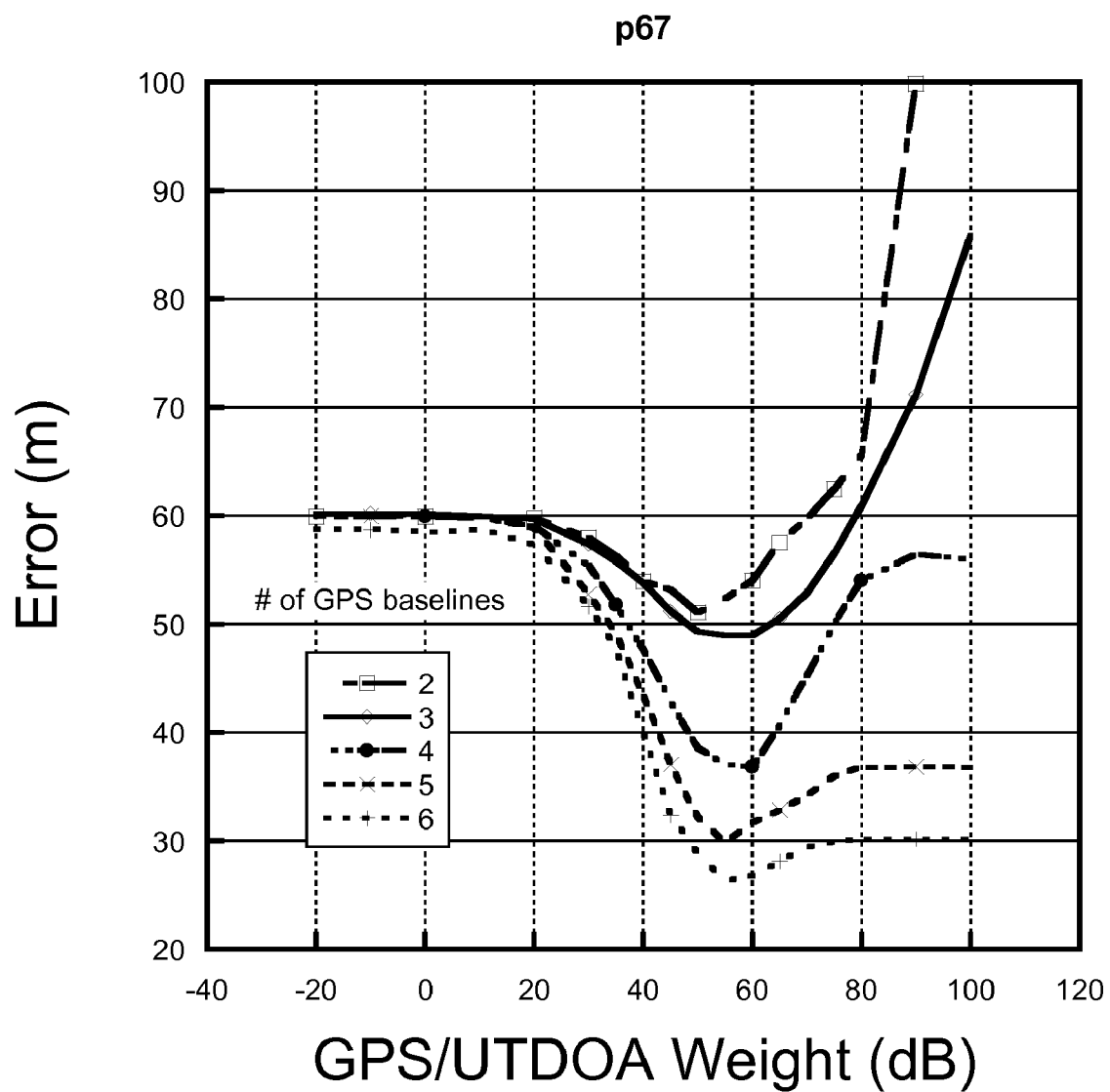
FIG. 6: Sample plot of empirical scaling of GPS and UTDOA weights.

An example plot is shown in FIG. 6 where the $67^{th}$ percentile of the location error is plotted as a function of S in decibels. For this example there are 30 UTDOA baselines and the number of GPS baselines is varied. The far left of FIG. 6 corresponds to a UTDOA-only solution and the far right corresponds to a GPS-only solution. Hybrid solutions between these extremes show good improvement relative to using only one of the technologies. For this example, it is clear that optimal scaling is in the range of 40-80 dB depending on the number of GPS baselines. This computation is performed offline when measurement data is available. Optimal values can vary slightly as a function of the both the number of GPS baselines and the number of UTDOA baselines which may indicate the use of a two dimensional lookup table for S to obtain further improvements. The coarse search can be used as the starting point for the fine search to reduce computation time. For this example, the coarse scaling factor is, $S_{c\_dB}=10 \log_{10}(283/1.2)^2=47$ dB, which is a slight under estimate of the scale factor that provides the minimum error.

Hybrid Weighted Least Squares (WLS) Algorithm:

A hybrid WLS algorithm is used that applies an analytical solution for biases in the GPS and UTDOA contributions. For the GPS contribution, the above transformation and weightings are performed and combined with the computed GPS UTDOA values obtained from the pseudorange measurements. It is also necessary to perform a 3-dimensional search for the GPS baselines.

Figure 7A:
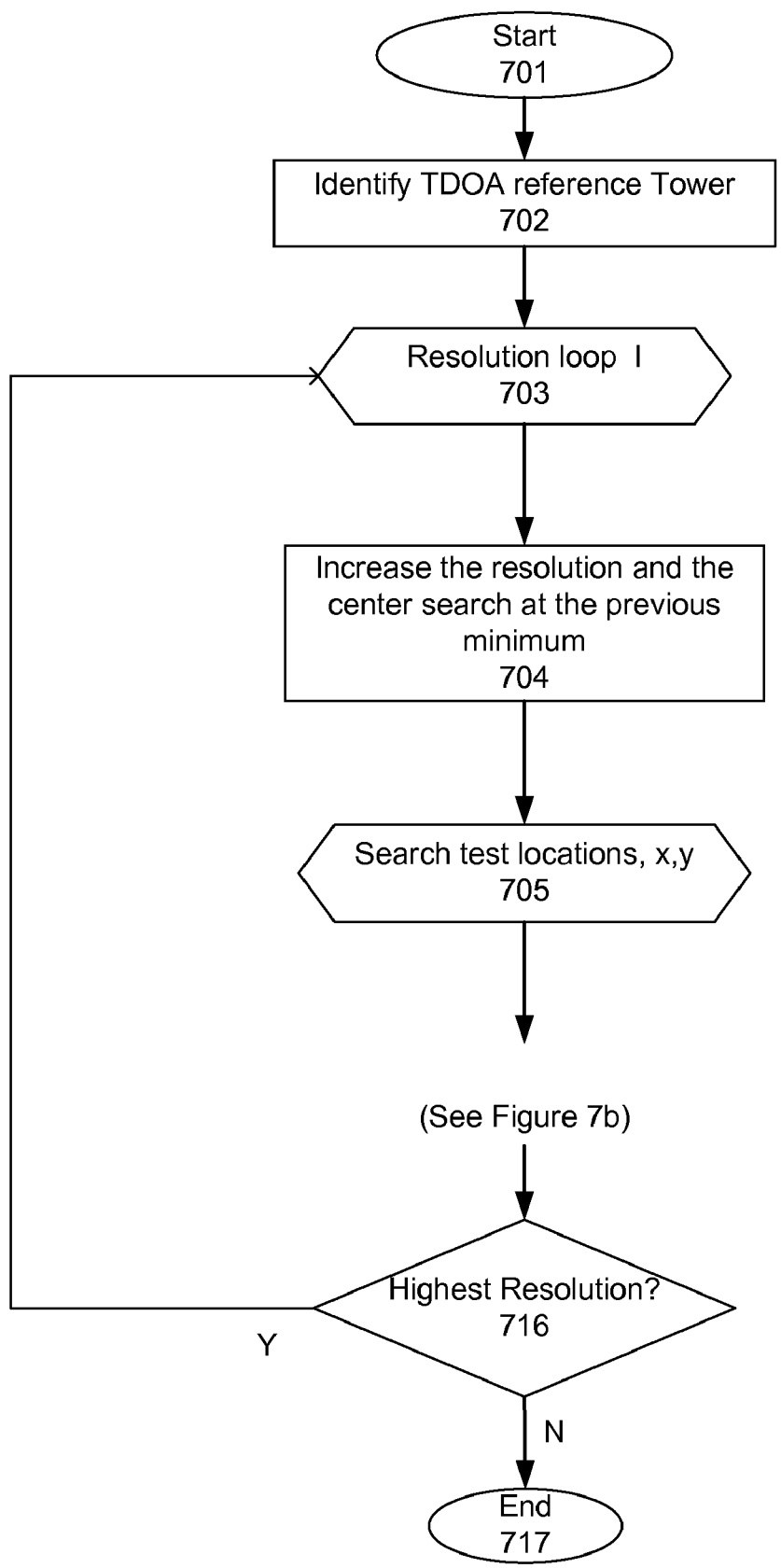
FIG. 7: Flow chart of search process.

FIG. 7a illustrates the search process and calls to the weighted least squares computation. Once the procedure begins 701, the TDOA reference tower must have been identified 702 as it is required to compute TDOA values assuming various test MS locations. The search is performed with increasing resolution until a stopping condition is met. The chi-square metrics are computed and summed for each test location. The UTDOA search is performed in two dimensions as usual. The z-search for the GPS baselines, is performed with increased precision as warranted by z-search criteria.

Computation of a combined chi-square metric now involves separate bias values for GPS and UTDOA. In general, the chi-square metric is computed as $$Q_s = \sum_{i=1}^{N} (TDOA_i - \tau_i - B)^2 W_i \qquad (9)$$

where,
$TDOA_i$ is the TDOA to $i^{th}$ site from reference site
$\tau_i$ is the LOS travel time from the current MS location to $i^{th}$ site
N is the number of baselines
B is a bias term [bias is a constant for all baselines and thus can be factored out]

A minimum solution over the bias is found by setting the derivative of (9) with respect to B equal to zero and solving for B giving $$B = \sum_{i=1}^{N} (TDOA_i - \tau_i) W_i \Big/ \sum_{i=1}^{N} W_i. \qquad (10)$$

Substituting (10) into (9) yields a bias corrected chi-square metric as $$Q_s = \sum_{i=1}^{N} (TDOA_i - \tau_i)^2 W_i - \left(\sum_{i=1}^{N} (TDOA_i - \tau_i) W_i\right)^2 \Big/ \sum_{i=1}^{N} W_i. \qquad (11)$$

The bias term includes additions to the true-time-of-flight of the radio signals that are constant for all received signals and can thus be mitigated. An example of Bias is receiver clock error which can be large for GPS and applies to all received GPS signals. Minimizing the bias with (10) eliminates the clock error dependency in (11). The combined chi-square metric is obtained from (11) as the sum of the individual chi-square metrics for the different technologies as $$Q_s = Q_{sU}(x,y) + Q_{sG}(x,y,z) \qquad (12)$$

where, $$Q_{sU}(x,y) = \sum_{i=1}^{N_U} (UTDOA_i - \tau_{Ui}(x,y))^2 W_{Ui} - \left(\sum_{i=1}^{N_U} (UTDOA_i - \tau_{Ui}(x,y)) W_{Ui}\right)^2 \Big/ \sum_{i=0}^{N_U} W_{Ui}$$

$$Q_{sG}(x,y,z) = \sum_{i=1}^{N_G} (GTDOA_i - \tau_{Gi}(x,y,z))^2 W_{Gi} - \left(\sum_{i=1}^{N_G} (GTDOA_i - \tau_{Gi}(x,y,z)) W_{Gi}\right)^2 \Big/ \sum_{i=1}^{N_G} W_{Gi}$$

and
$N_G$ is the number of GPS baselines
$N_U$ is the number of UTDOA baselines
$GTDOA_i$ is the translated GPS pseudorange measurement for the ith baseline
$UTDOA_i$ is the UTDOA measurement for the ith baseline
$W_{Gi}$ is the GPS baseline weight
$W_{Ui}$ is the UTDOA baseline weight $$\tau_{Gi} = \tau_{SAT-MS}(x,y,z) - \tau_{SAT-Ref}(x,y,z)$$

$$\tau_{Ui} = \tau_{MS-Coop}(x,y) - \tau_{MS-Ref}(x,y).$$

For each map resolution, the location that minimizes (12) is stored. For each successive resolution, the search region is centered at the previous minimum. If the minimum location falls on the edge of the map, then the resolution is not increased but the search region is shifted. The search process ends when the minimum is found at a predetermined highest resolution.

Z-Search Technique:

Since altitude position estimation is required for accurate GPS solutions and not for UTDOA, a rapid search algorithm is employed to efficiently utilize the GPS measurements. This includes an initial estimation, a coarse search, a fine search and the use of steering criteria.

Figure 8:
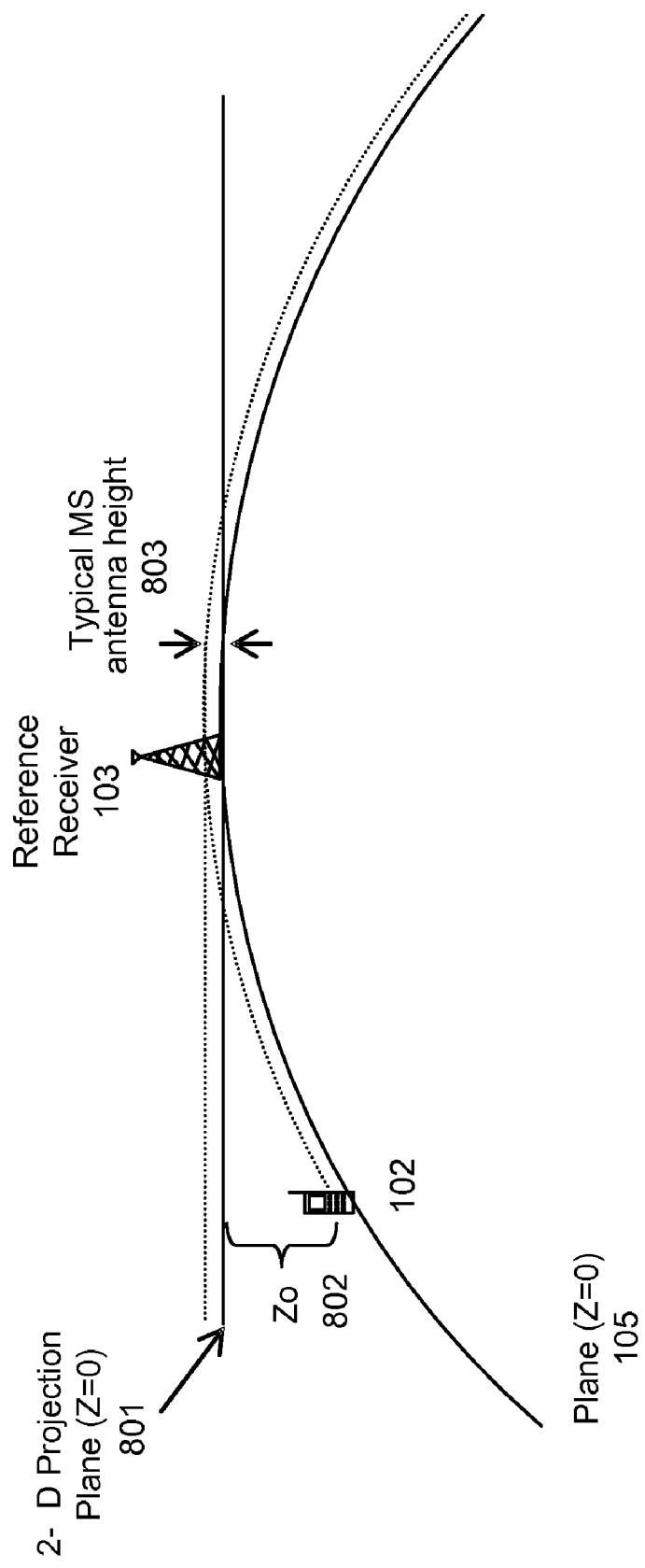
FIG. 8: Illustration of initial vertical positioning.

FIG. 8 illustrates the initial estimation of the z position. This figure shows the position the reference tower 103 at the center of the projection of the Earth's surface 105 onto a two dimensional plane 801. In the UTDOA coordinate system, the reference base station elevation defines Z=0. When considering the Earth's curvature 105, an initial search position in the z-dimension can be found with respect to the UTDOA coordinate system. The coarse search involves computing and using an initial Z estimate, Zo, 802 which is the position of the Mobile Device 102 at a typical height above ground level 803 as shown in the figure.

Figure 9:
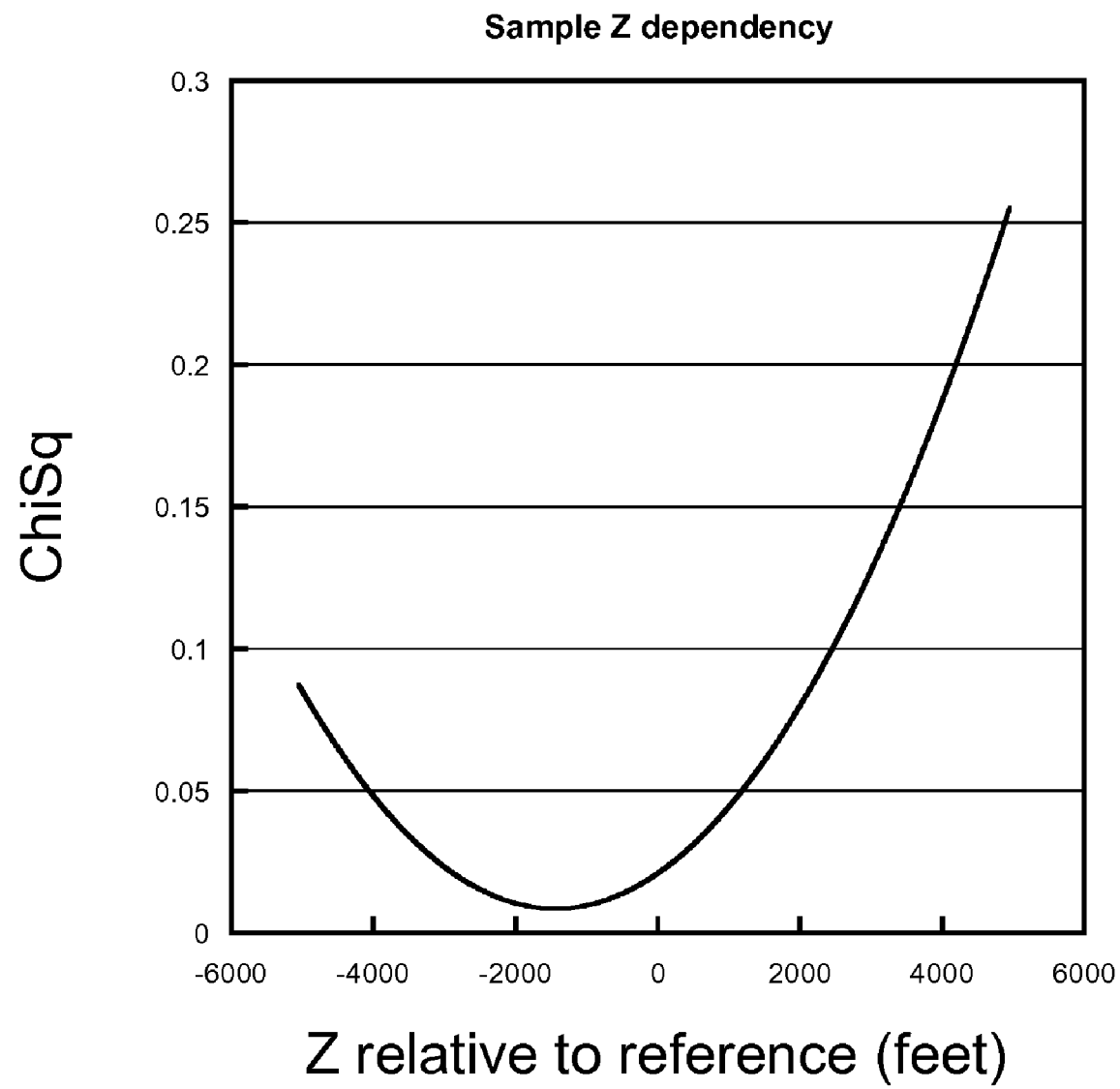
FIG. 9: Sample z-dependency on the chi-square metric.
Figure 10:
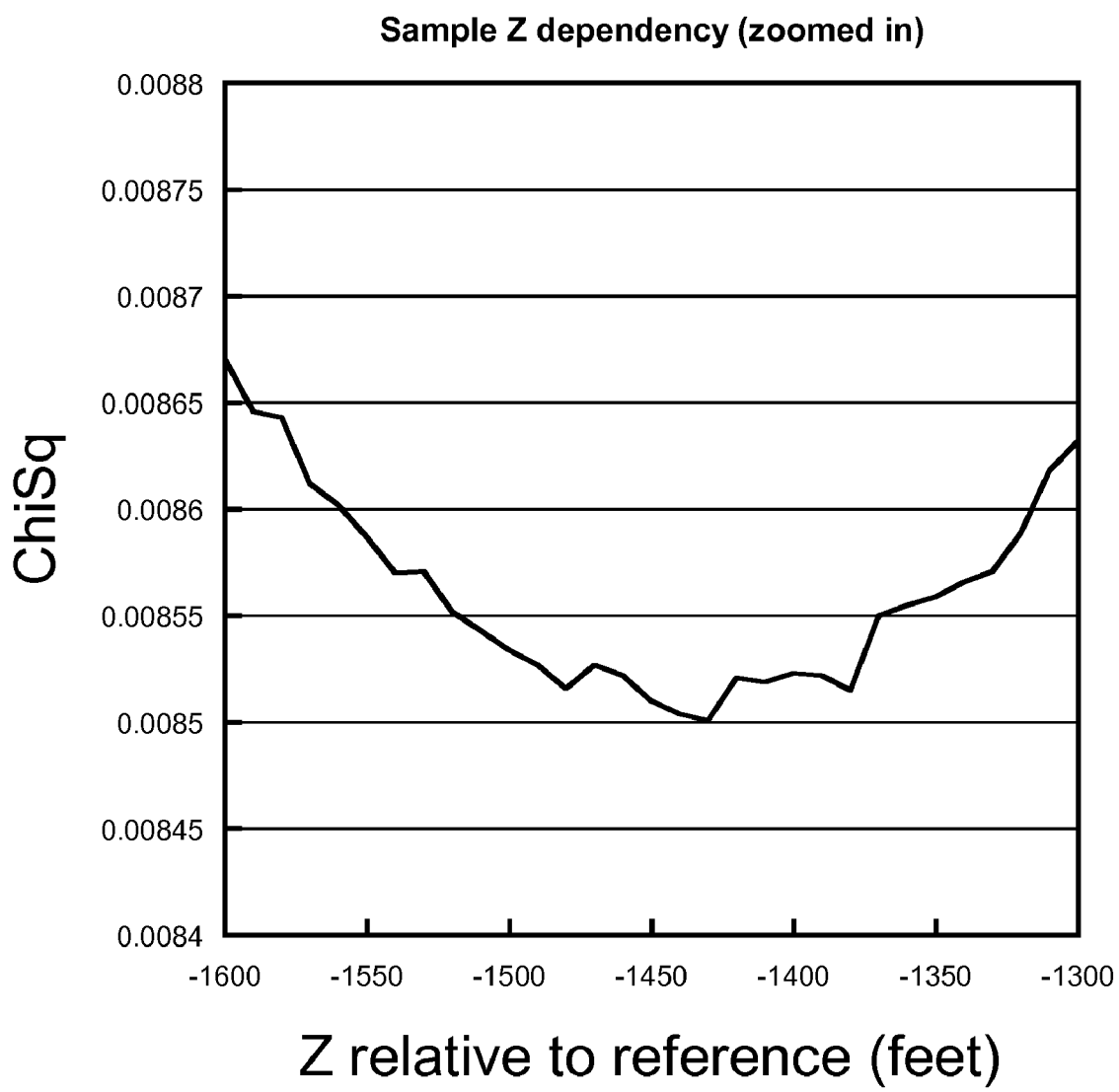
FIG. 10: Illustration of uncertainty in the chi-square calculations as a function of z-dimension.

FIG. 9 illustrates the dependency of the chi-square metric on the Z-position. Here it is evident that it is desirable to find the Z-value at the minimum of this plot. Due to measurement uncertainties, a smooth curve is not guaranteed. FIG. 10 shows the randomness in the Z dependency by enlarging FIG. 9.

Figure 7B:
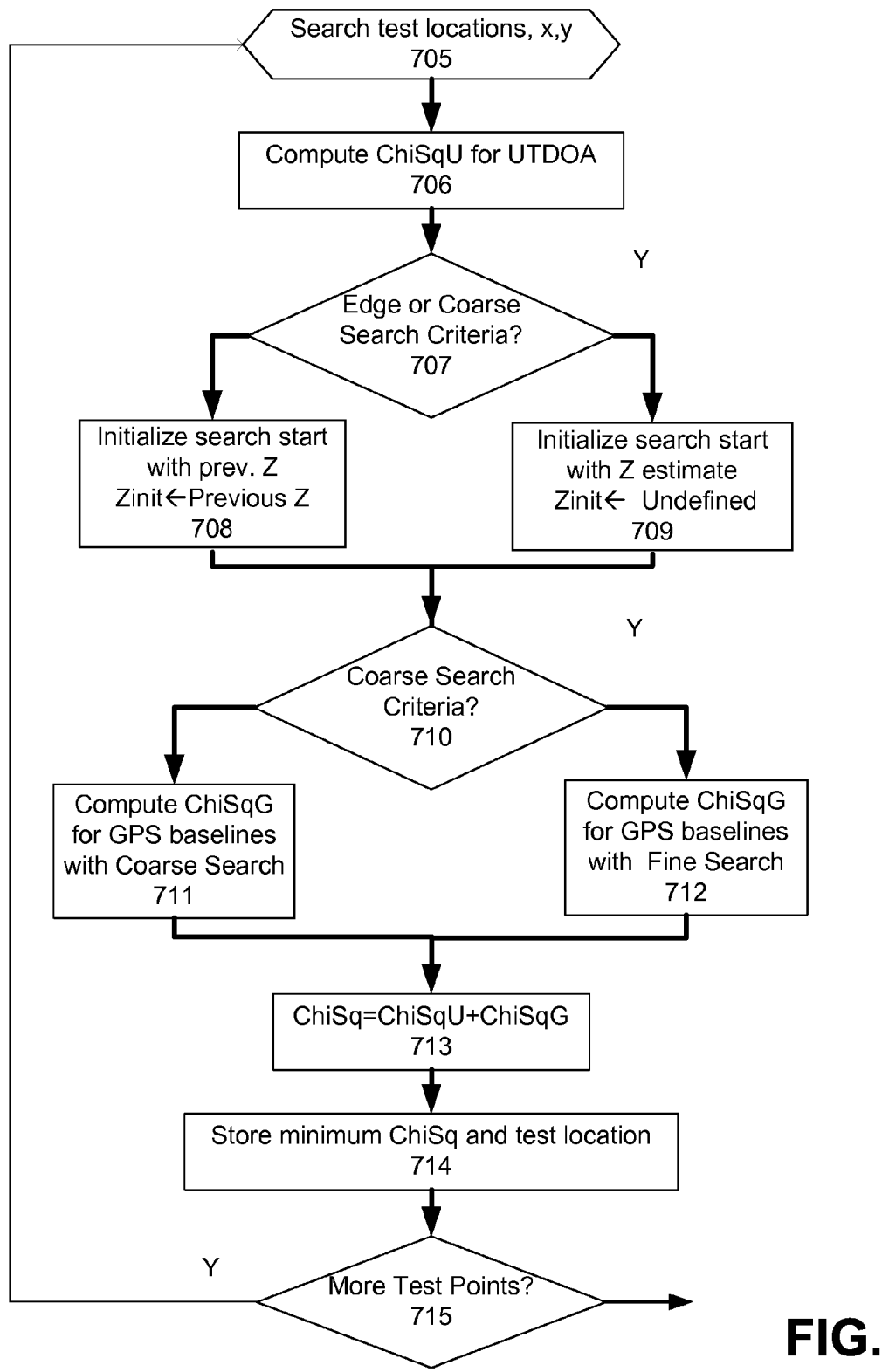

It is necessary to make tradeoffs between the computational speed and the accuracy of the Z estimate. In FIG. 7b logic is shown for the initialization of the Z search 707, 708, 709 and a decision 710 for selecting a coarse search 711 or the fine search 712. The coarse search criteria consist of selecting the coarse search for resolutions that are below a predetermined resolution threshold. Once the resolution threshold is reached, then the fine search is performed. The searches start from an initial Z value, Zint. The searches may optionally compute the initial Z estimate, Zo. This computation is specified by setting Zint to a predetermined undefined value 709. The initial starting point will also be computed as Zo when the test location is at the edge of the search region 709. When the fine search is selected and the start of the search is not at the edge of the search region, the z-component from the prior search is used as the starting point for the current Z search 708.

Figure 11A:
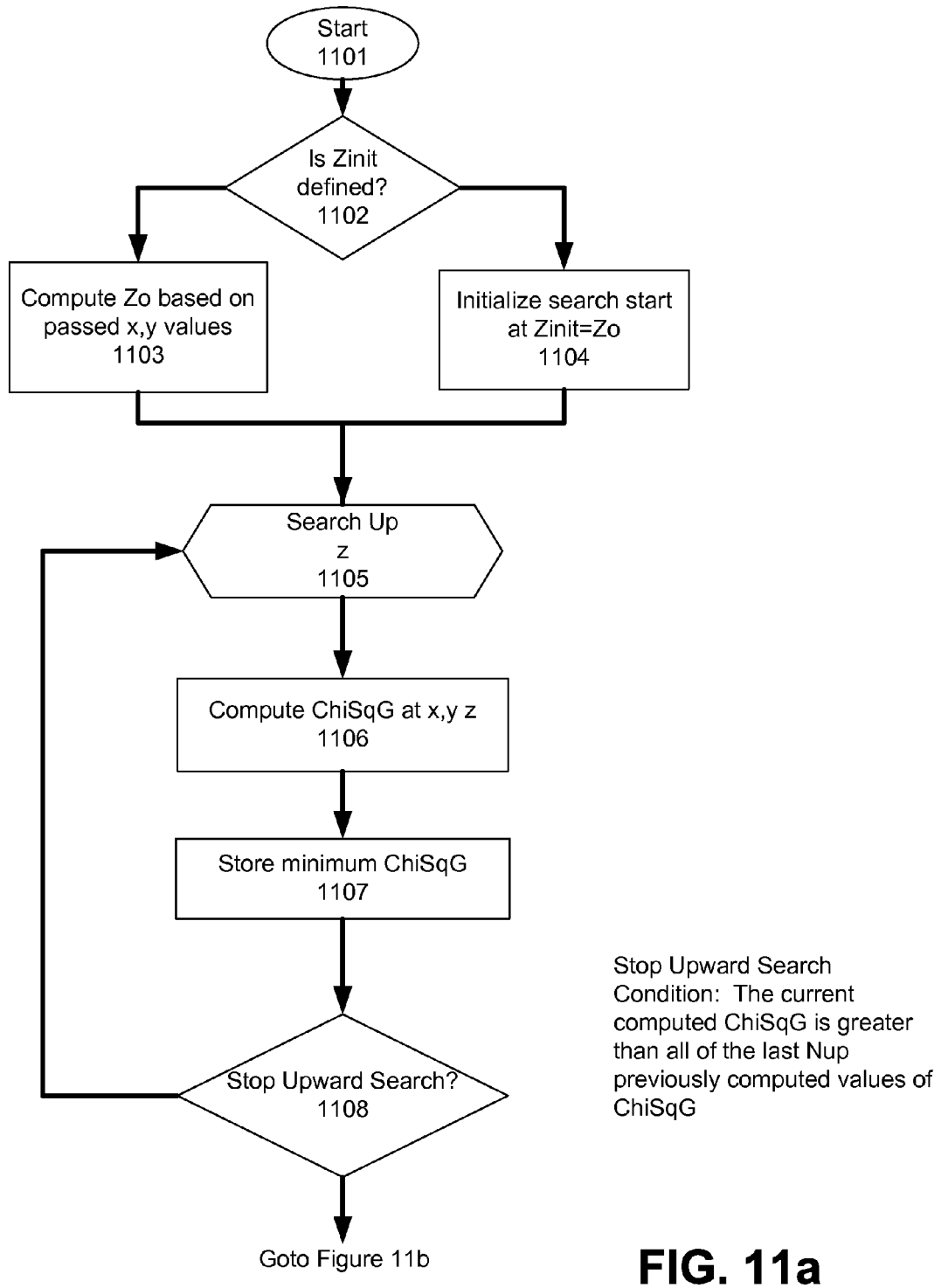
FIG. 11: Flow chart of the fine z search.
Figure 11B:
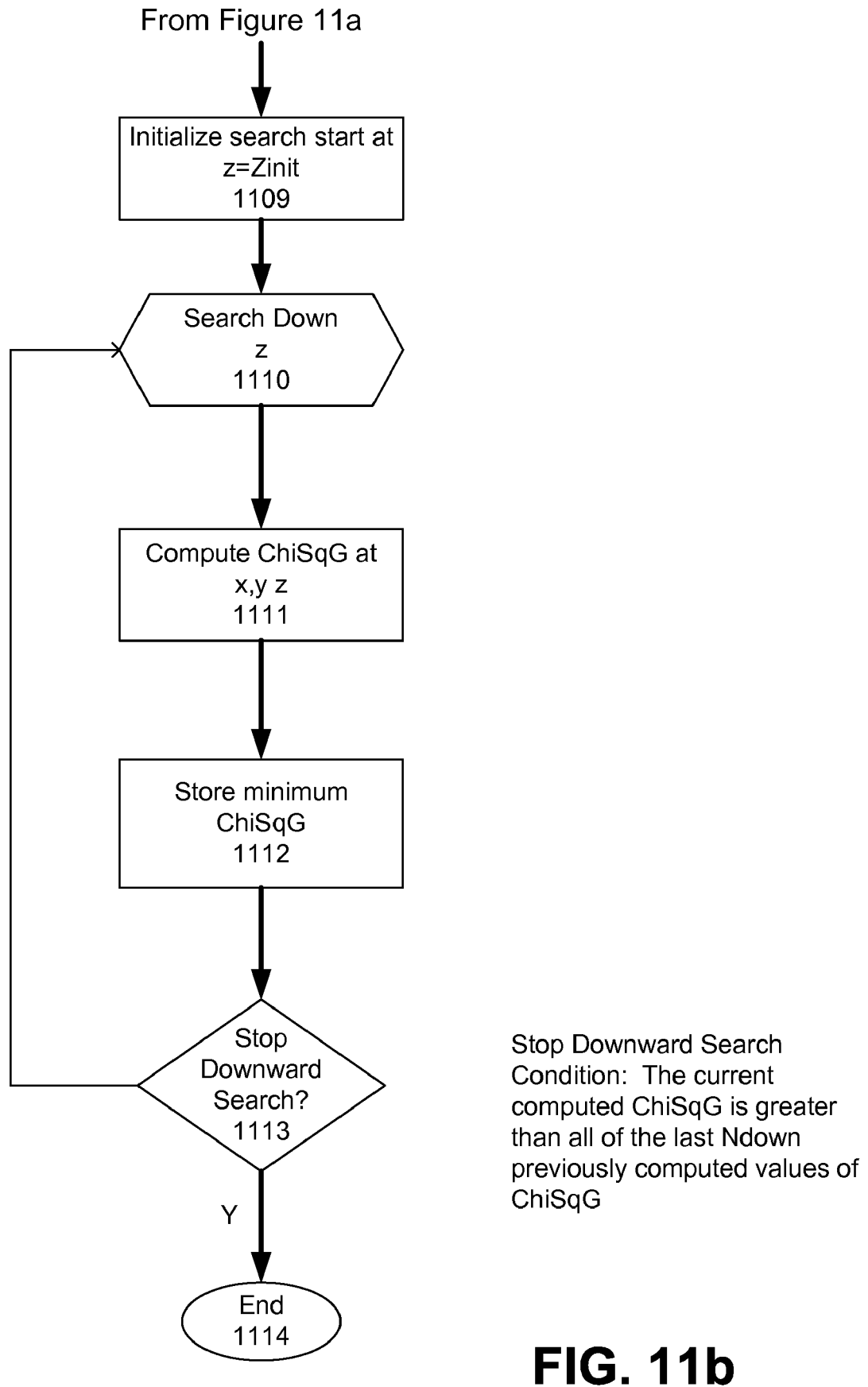

FIG. 11a and FIG. 11b show how the fine Z search is performed. Once the fine Z search procedure is begun 1101, if the initial search position is undefined 1102, then Zo is computed and used as the start of the search 1104. Otherwise, the initial passed value is used as the start 1103. The search is performed in the upward direction (increasing z) by changing the test z point 1105, computing the chi-square metric 1106 and storing the minimum 1107. The upward search continues until there are Nup consecutive chi-square values that are smaller than the current chi-square metric 1108.

Next, a downward search is performed as depicted in FIG. 11b. The search starting point is initialized to Zint 1109. The search is performed in the downward direction (decreasing z) by changing the test z point 1110, computing the chi-square metric 1111 and storing the minimum 1112. The downward search continues until there are Ndown consecutive chi-square values that are smaller than the current chi-square value at which time the downward search is stopped 1113. Once ended 1114, the fine Z search returns the minimum chi-square value over all of the test points.

Iterative Downweighting:

Downweighting of GPS baselines is performed iteratively. Effective downweighting of UTDOA and GPS baselines are different due to differences in the mechanisms that generate outliers. A median absolute deviation (MAD) operation [5] is applied to GPS baselines and combined with conventional downweighting operations for UTDOA.

Figure 12:
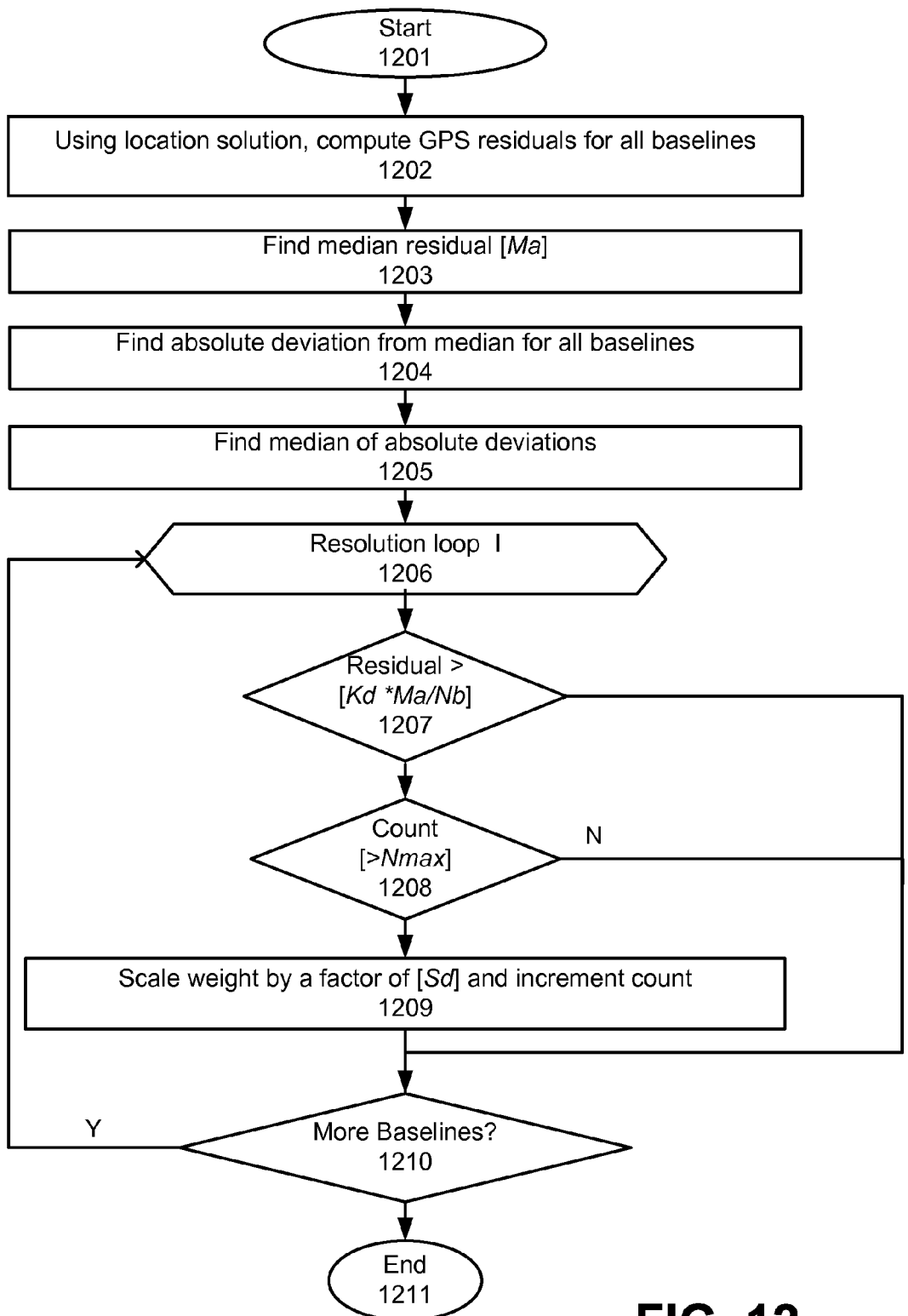
FIG. 12: Flow chart of GPS downweighting process.

The GPS downweighting flow chart is shown in FIG. 12. The following terminology is used in FIG. 12:

Kd—constant scaling for downweighting
Ma—median of absolute deviation
Nb—number of GPS baselines
Nmax—maximum number of baselines to be downweighted
Sd downweighting scale factor Once the GPS downweighting procedure is entered 1201, the current location solution is used to find the GPS residual, $GTDOA_i - \tau_{Gi}(x,y,z)$, for each baseline 1202. The median residual is then computed 1203 along with the absolute deviation from the median 1204. The median of the absolute deviation, Ma, is then computed 1205.

It is the median of the absolute deviation, Ma, that is used in a loop 1206 over the baselines to determine whether the baseline should be downweighted. A residual threshold is defined as Kd*Ma/Nb where Kd is a constant and Nb is the number of GPS baselines 1207. If the residual is larger than this threshold and the number of downweighted baselines is below a maximum given by Nmax, 1208 then the baseline is downweighted by a scale factor Sd 1209. When all baselines have been considered 1210, the iterative downweighting ends 1211.

Figure 13:
FIG. 13: Example of Bias.
Figure 13:
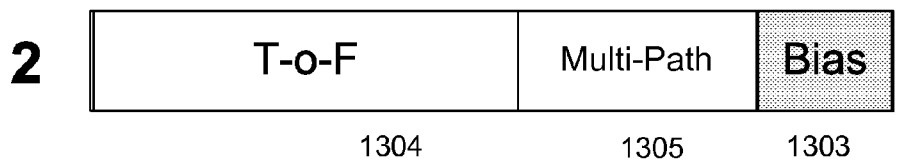
Figure 13:
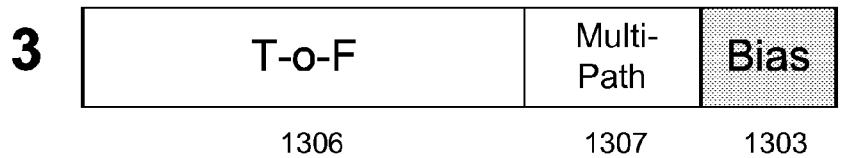
Figure 13:
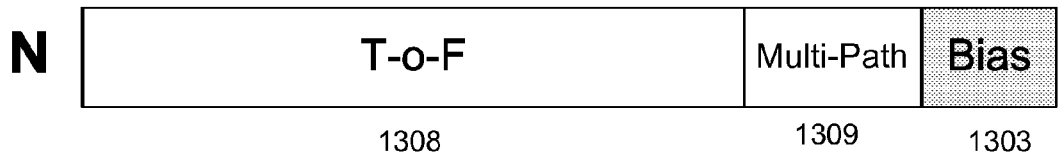

FIG. 13 is used to illustrate the bias incurred by a receiver. In each case the time difference of arrival is corrupted by reception of un-resolvable multi-path components 1302 1305 1307 1309 and receiver bias 1303 limiting the ability of the receiver to ascertain the true time-of-flight (TOF) 1301 1304 1306 1308. However, since the bias is a constant value, it can be factored out before final position calculation.

CONCLUSION

The true scope the present invention is not limited to the presently preferred embodiments disclosed herein. For example, the foregoing disclosure of a presently preferred embodiment of a Hybrid Wireless Location System uses explanatory terms, such as Position Determining Entity (PDE), Global Positioning System (GPS), Mobile Station (MS) and the like, which should not be construed so as to limit the scope of protection of the following claims, or to otherwise imply that the inventive aspects of the Wireless Location System are limited to the particular methods and apparatus disclosed.

Moreover, as will be understood by those skilled in the art, many of the inventive aspects disclosed herein may be applied in location systems that are not based on TDOA techniques. For example, the invention is not limited to systems employing PDE's constructed as described above. The TDOA receivers, PDE's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the PDE) described herein to another functional element (such as the BTS) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A method for use in locating a mobile device, comprising:
(a) at the mobile device, obtaining pseudorange measurements based on signals received from one or more satellites, wherein said one or more satellites are satellites of at least one of a Global Navigation Satellite System (GNSS) or Global Positioning System (GPS);

(b) computing GPS time difference of arrival (G-TDOA) values based on the GPS pseudorange measurements, said G-TDOA values representing baselines between the mobile device and the GPS/GNSS satellites;

(c) obtaining an uplink time difference of arrival (U-TDOA) measurement representing a first baseline between first and second terrestrial receivers;

(d) providing hybrid GPS/U-TDOA baselines;

(e) computing weightings for the hybrid GPS/U-TDOA baselines; and (f) estimating the location of the mobile device using the hybrid GPS/U-TDOA baselines and the weightings.

2. A method for use in locating a mobile device, comprising:

at the mobile device, obtaining pseudorange measurements based on signals received from one or more satellites, wherein said one or more satellites are satellites of at least one of a Global Navigation Satellite System (GNSS) or Global Positioning System (GPS);

computing GPS time difference of arrival (G-TDOA) values based on the GPS pseudorange measurements, said G-TDOA values representing baselines between the mobile device and the GPS/GNSS satellites;

obtaining an uplink time difference of arrival (U-TDOA) measurement representing a first baseline between first and second terrestrial receivers;

providing hybrid GPS/U-TDOA baselines;

computing weightings for the hybrid GPS/U-TDOA baselines, wherein the step of computing weightings comprises an iterative downweighting method including determining a hybrid position estimate using a current baseline weighting, and then downweighting the U-TDOA baselines and G-TDOA baselines, until either a first or second prescribed stopping condition is met; and estimating the location of the mobile device using the hybrid GPS/U-TDOA baselines and the weightings.

3. A method as recited in claim 2, wherein the first stopping condition is deemed to be met when the number of iterations exceeds a predetermined maximum.

4. A method as recited in claim 3, wherein a last location solution is used as the estimate of the location of the mobile device when the first stopping condition is met.

5. A method as recited in claim 2, further comprising determining a geometric dilution of precision (GDOP) value, wherein the second stopping condition is deemed to be met when the GDOP exceeds a predetermined threshold.

6. A method as recited in claim 5, wherein a location solution from a previous iteration is used as the estimate of the location of the mobile device when the second stopping condition is met.

7. A method as recited in claim 1, wherein the method is carried out in a hybrid wireless location system comprising a U-TDOA wireless location network and an assisted-GPS (A-GPS) network.

8. A method as recited in claim 7, wherein radio data streams from at least one satellite of the Global Positioning System or Global Navigation Satellite System are received by the mobile device, a reference receiver and at least one cooperating receiver in the U-TDOA location subsystem, said data streams including Almanac and Ephemeris Data in a pre-established format, wherein the mobile device is enabled to potentially self locate with an estimate of the geodetic or ellipsoidal altitude.

9. A method as recited in claim 7, wherein the U-TDOA wireless location network comprises a network of geographically distributed receivers and a position determining entity (PDE) configured to use uplink transmissions from the mobile device and a time base provided by radio transmissions from at least one satellite of the Global Positioning System or Global Navigation Satellite System to detect the time difference of arrival between the reference receiver and at least two cooperating receivers, and to calculate a position estimate using a multi-lateration algorithm.

10. A method for use in locating a mobile device, comprising:

at the mobile device, obtaining pseudorange measurements based on signals received from one or more satellites, wherein said one or more satellites are satellites of at least one of a Global Navigation Satellite System (GNSS) or Global Positioning System (GPS);

computing GPS time difference of arrival (G-TDOA) values based on the GPS pseudorange measurements, said G-TDOA values representing baselines between the mobile device and the GPS/GNSS satellites;

obtaining an uplink time difference of arrival (U-TDOA) measurement representing a first baseline between first and second terrestrial receivers;

providing hybrid GPS/U-TDOA baselines;

computing weightings for the hybrid GPS/U-TDOA baselines; and estimating the location of the mobile device using the hybrid GPS/U-TDOA baselines and the weightings;

wherein the step of computing G-TDOA values comprises employing a process for transforming GPS pseudoranges to U-TDOA values, said process comprising comparing GPS pseudoranges with geometric distances to a reference station of the U-TDOA wireless location network and computing a TDOA value for the satellite signal received at the mobile device and the reference station, respectively, wherein the positions of the satellite and the reference station are known, and wherein the computed TDOA value represents the G-TDOA value.

11. A method as recited in claim 10, wherein said process for transforming GPS pseudoranges to U-TDOA values further comprises identifying the reference station and computing TDOA values for each satellite, including, for each satellite:

i. finding the position of the satellite and making corrections to the pseudoranges so that they reflect geometric distances;

ii. computing the propagation delay between the satellite and the reference station;

iii. computing the measured propagation time between the satellite and the mobile device, the computed time including a receiver clock error bias;

iv. computing the G-TDOA value as the difference between the propagation delay from the satellite to the mobile device and the propagation delay from the satellite to the reference station;

v. computing a correlation coefficient for a cross-correlation between a received pseudorandom noise (PRN) signal at the mobile device and a hypothetical reception of the PRN at the reference station;

vi. determining that the signal-to-noise ratio (SNR) at the reference station is large relative to the SNR at the mobile device;

vii. using the SNR to obtain a measure of quality of the pseudorange measurement; and viii. repeating the procedure for each satellite whose signals are received by the mobile device.

12. A method as recited in claim 11, further comprising obtaining a measure of a correlation coefficient for the G-TDOA value using the SNR at the mobile device.

13. A method as recited in claim 12, wherein the correlation coefficient for an i-th pseudorange measurement ($\rho_1$) associated with a G-TDOA value generally satisfies the following relationship with the SNR at the mobile device: $\rho_i = 1/(1+1/SNR_i)^{1/2}$.

14. A method as recited in claim 1, further comprising a process for weighting pseudorange measurements, said process comprising weighting pseudorange measurements based on a signal-to-noise ratio (SNR) reported by the GPS receiver used to obtain the pseudorange measurements.

15. A method for use in locating a mobile device, comprising:
at the mobile device, obtaining pseudorange measurements based on signals received from one or more satellites, wherein said one or more satellites are satellites of at least one of a Global Navigation Satellite System (GNSS) or Global Positioning System (GPS);
computing GPS time difference of arrival (G-TDOA) values based on the GPS pseudorange measurements, said G-TDOA values representing baselines between the mobile device and the GPS/GNSS satellites;
obtaining an uplink time difference of arrival (U-TDOA) measurement representing a first baseline between first and second terrestrial receivers;
providing hybrid GPS/U-TDOA baselines;
computing weightings for the hybrid GPS/U-TDOA baselines;
estimating the location of the mobile device using the hybrid GPS/U-TDOA baselines and the weightings; and
further comprising a process for weighting pseudorange measurements based on a signal-to-noise ratio (SNR) reported by the GPS receiver used to obtain the pseudorange measurements, wherein said process for weighting pseudorange measurements comprises the use of an iterative downweighting process for scaling GPS and U-TDOA weights based on prescribed factors, including measurement error distribution for U-TDOA and GPS, the number of GPS measurements available, and the number of U-TDOA measurements available.

16. A method for use in locating a mobile device, comprising:
at the mobile device, obtaining pseudorange measurements based on signals received from one or more satellites, wherein said one or more satellites are satellites of at least one of a Global Navigation Satellite System (GNSS) or Global Positioning System (GPS);
computing GPS time difference of arrival (G-TDOA) values based on the GPS pseudorange measurements, said G-TDOA values representing baselines between the mobile device and the GPS/GNSS satellites;
obtaining an uplink time difference of arrival (U-TDOA) measurement representing a first baseline between first and second terrestrial receivers;
providing hybrid GPS/U-TDOA baselines;
computing weightings for the hybrid GPS/U-TDOA baselines;
estimating the location of the mobile device using the hybrid GPS/U-TDOA baselines and the weightings; and
further comprising a process for weighting pseudorange measurements based on a signal-to-noise ratio (SNR) reported by the GPS receiver used to obtain the pseudorange measurements, wherein said process for weighting pseudorange measurements comprises computing, for each GPS baseline, an initial weighting based on a theoretical TDOA RMS error.

17. A method as recited in claim 16, wherein the theoretical Additive White Gaussian Noise (AWGN) TDOA RMS error ($aTDOA_{rms\_i}$) is based on the air interface and computed for each GPS baseline using the GPS SNR and air interface parameters for the U-TDOA measurements.

18. A method as recited in claim 16, wherein the TDOA RMS error is increased by multipath effects ($\sigma_{M\_i}$) and computed for each GPS baseline using the GPS SNR and air interface parameters for the U-TDOA measurements.

19. A method as recited in claim 17, further comprising computation of a weight ($W_{ai}$) as an inverse function of the RMS error squared, $$W_{ai} = \frac{1}{aTDOA_{rms\_i}^2 + \sigma_{M\_i}^2}.$$

20. A method as recited in claim 17, wherein said process for weighting pseudorange measurements further comprises scaling the theoretical weighting measurement data.

21. A method as recited in claim 14, wherein said process for weighting pseudorange measurements further comprises employing a database of GPS baseline measurement errors and a database of U-TDOA measurement errors compiled from past GPS and U-TDOA location measurements.

22. A method as recited in claim 21, wherein said process for weighting pseudorange measurements further comprises employing a coarse scaling factor ($S_c$), wherein said coarse scaling factor, $S_c$, represents a ratio of RMS error averaged over said GPS baseline measurement errors and said U-TDOA measurement errors.

23. A method as recited in claim 22, wherein said coarse scaling factor, $S_c$, is defined as $$S_c = \frac{UTDOA_{rms}^2}{GTDOA_{rms}^2}$$

where $GTDOA_{rms}$ represents the measured GPS RMS error and $UTDOA_{rms}$ represents the measured U-TDOA RMS error.

24. A method as recited in claim 23, wherein said process for weighting pseudorange measurements further comprises assigning, as an initial weighting for each GPS baseline, a product of the coarse scaling factor and the weight from the theoretical GPS TDOA.

25. A method as recited in claim 24, wherein said product assigned as an initial weighting is defined as $$W_{gi} = \frac{UTDOA_{rms}^2}{GTDOA_{rms}^2} \frac{1}{aTDOA_{rms\_i}^2} = S_c W_{ai}.$$

26. A method as recited in claim 21, wherein said process for weighting pseudorange measurements further comprises employing a fine scale factor ($S_f$) computed using hybrid GPS/U-TDOA measurements.

27. A method as recited in claim 26, wherein said fine scale factor is employed to derive a final measurement weight as follows:

$$W_{Gi} = S W_{ai}$$

where $S = S_f S_c$.

28. A method for use in locating a mobile device, comprising:
- at the mobile device, obtaining pseudorange measurements based on signals received from one or more satellites, wherein said one or more satellites are satellites of at least one of a Global Navigation Satellite System (GNSS) or Global Positioning System (GPS);
- computing GPS time difference of arrival (G-TDOA) values based on the GPS pseudorange measurements, said G-TDOA values representing baselines between the mobile device and the GPS/GNSS satellites;
- obtaining an uplink time difference of arrival (U-TDOA) measurement representing a first baseline between first and second terrestrial receivers;
- providing hybrid GPS/U-TDOA baselines;
- computing weightings for the hybrid GPS/U-TDOA baselines;
- estimating the location of the mobile device using the hybrid GPS/U-TDOA baselines and the weightings; and
- employing a hybrid weighted least squares algorithm, said algorithm providing an analytical solution for biases in the GPS and U-TDOA contributions, including performing transformation of GPS pseudorange contributions and combining the transformed and weighted GPS contributions with computed G-TDOA values obtained from the pseudorange measurements.

29. A method as recited in claim 28, wherein said hybrid weighted least squares algorithm further comprises performing a three-dimensional search for GPS baselines.

30. A method as recited in claim 29, wherein said hybrid weighted least squares algorithm further comprises the computation of TDOA values assuming test locations of the mobile device and searching until a prescribed stopping condition is met, including computing chi-square metrics and summing said metrics for each test location.

31. A method as recited in claim 30, wherein said hybrid weighted least squares algorithm further comprises computation of a combined chi-square metric including separate bias values for GPS and U-TDOA.

32. A method as recited in claim 31, wherein said hybrid weighted least squares algorithm further comprises determining a minimum chi square metric and corresponding test location, wherein the stopping condition is deemed to be met when the minimum is found at a predetermined highest resolution.

33. A method as recited in claim 30, wherein a U-TDOA search is performed in three dimensions that includes the transformed GPS UTDOA baselines, said U-TDOA search comprising first searching for a minimum chi square metric over all GPS baselines in two dimensions (x, y) and then employing a z-search algorithm to search in a third dimension (z).

34. A method as recited in claim 30, wherein a prescribed stopping condition includes a continuation of the search at the current resolution when the minimum location solution falls on the edge of the search space.

35. A method as recited in claim 30, wherein a prescribed stopping condition includes a continuation of the search at the current map resolution when the minimum location solution falls on the edge of the search space.

36. A method as recited in claim 33, wherein said z-search algorithm comprises the use of an initial estimation of the mobile device's altitude, a coarse search, a fine search, and steering criteria.

37. A method as recited in claim 36, wherein said z-search algorithm further comprises finding an initial search position in the z-dimension with respect to a UTDOA coordinate system; wherein said coarse search comprises computing and using an initial estimate, Zo, representing the position of the mobile device at a typical height above ground level; wherein said steering criteria includes selecting the coarse search for resolutions below a predetermined resolution threshold, and performing the fine search once the resolution threshold is reached.

38. A wireless location system, comprising:
- means for communicating with a mobile device and obtaining from said mobile device pseudorange measurements based on signals received by said mobile device from one or more satellites, wherein said one or more satellites are satellites of at least one of a Global Navigation Satellite System (GNSS) or Global Positioning System (GPS);
- means for computing GPS time difference of arrival (G-TDOA) values based on the GPS pseudorange measurements, said G-TDOA values representing baselines between the mobile device and the GPS/GNSS satellites;
- means for obtaining an uplink time difference of arrival (U-TDOA) measurement representing a first baseline between first and second terrestrial receivers;
- means for providing hybrid GPS/U-TDOA baselines;
- means for computing weightings for the hybrid GPS/U-TDOA baselines, wherein the means for computing weightings comprises means for carrying out an iterative downweighting including determining a hybrid position estimate using a current baseline weighting, and then downweighting the U-TDOA baselines and G-TDOA baselines, until either a first or second prescribed stopping condition is met; and
- means for estimating the location of the mobile device using the hybrid GPS/U-TDOA baselines and the weightings.

39. A system as recited in claim 38, wherein the first stopping condition is deemed to be met when the number of iterations exceeds a predetermined maximum.

40. A system as recited in claim 39, wherein a last location solution is used as the estimate of the location of the mobile device when the first stopping condition is met.

41. A system as recited in claim 38, further comprising means for determining a geometric dilution of precision (GDOP) value, wherein the second stopping condition is deemed to be met when the GDOP exceeds a predetermined threshold.

42. A system as recited in claim 41, wherein a location solution from a previous iteration is used as the estimate of the location of the mobile device when the second stopping condition is met.

43. A system as recited in claim 38, wherein the system is a hybrid wireless location system comprising a U-TDOA wireless location network and an assisted-GPS (A-GPS) network.

44. A system as recited in claim 43, wherein radio data streams from at least one satellite of the Global Positioning System or Global Navigation Satellite System are received by the mobile device, a reference receiver and at least one cooperating receiver in the U-TDOA location subsystem, said data streams including Almanac and Ephemeris Data in a pre-established format, wherein the mobile device is enabled to potentially self locate with an estimate of the geodetic or ellipsoidal altitude.

45. A system as recited in claim 43, wherein the U-TDOA wireless location network comprises a network of geographically distributed receivers and a position determining entity (PDE) configured to use uplink transmissions from the mobile device and a time base provided by radio transmissions from at least one satellite of the Global Positioning System or Global Navigation Satellite System to detect the time difference of arrival between the reference receiver and at least two cooperating receivers, and to calculate a position estimate using a multi-lateration algorithm.

46. A system as recited in claim 38, wherein the means for computing G-TDOA values employs a process for transforming GPS pseudoranges to U-TDOA values, said process comprising: comparing GPS pseudoranges with geometric distances to a reference station of the U-TDOA wireless location network and computing a TDOA value for the satellite signal received at the mobile device and the reference station, respectively, wherein the positions of the satellite and the reference station are known, and wherein the computed TDOA value represents the G-TDOA value.

47. A system as recited in claim 46, wherein said process for transforming GPS pseudoranges to U-TDOA values further comprises identifying the reference station and computing TDOA values for each satellite, including, for each satellite:
   i. finding the position of the satellite and making corrections to the pseudoranges so that they reflect geometric distances;
   ii. computing the propagation delay between the satellite and the reference station;
   iii. computing the measured propagation time between the satellite and the mobile device, the computed time including a receiver clock error bias;
   iv. computing the G-TDOA value as the difference between the propagation delay from the satellite to the mobile device and the propagation delay from the satellite to the reference station;
   v. computing a correlation coefficient for a cross-correlation between a received pseudorandom noise (PRN) signal at the mobile device and a hypothetical reception of the PRN at the reference station;
   vi. determining that the signal-to-noise ratio (SNR) at the reference station is large relative to the SNR at the mobile device;
   vii. using the SNR to obtain a measure of quality of the pseudorange measurement; and
   viii. repeating the procedure for each satellite whose signals are received by the mobile device.

48. A system as recited in claim 47, further comprising means for obtaining a measure of a correlation coefficient for the G-TDOA value using the SNR at the mobile device.

49. A system as recited in claim 48, wherein the correlation coefficient for an i-th pseudorange measurement ($\rho_1$) associated with a G-TDOA value generally satisfies the following relationship with the SNR at the mobile device: $\rho_i = 1/(1+1/SNR_i)^{1/2}$.

50. A system as recited in claim 38, further comprising means for performing a process for weighting pseudorange measurements, said process comprising weighting pseudorange measurements based on a signal-to-noise ratio (SNR) reported by the GPS receiver used to obtain the pseudorange measurements.

51. A system as recited in claim 50, wherein said process for weighting pseudorange measurements comprises the use of an iterative downweighting process for scaling GPS and U-TDOA weights based on prescribed factors, including measurement error distribution for U-TDOA and GPS, the number of GPS measurements available, and the number of U-TDOA measurements available.

52. A system as recited in claim 50, wherein said process for weighting pseudorange measurements comprises computing, for each GPS baseline, an initial weighting based on a theoretical TDOA RMS error.

53. A system as recited in claim 52, wherein the theoretical Additive White Gaussian Noise (AWGN) TDOA RMS error ($aTDOA_{rms\_i}$) is based on the air interface and computed for each GPS baseline using the GPS SNR and air interface parameters for the U-TDOA measurements.

54. A system as recited in claim 52, wherein the TDOA RMS error is increased by multipath effects ($\sigma_{M\_i}$) and computed for each GPS baseline using the GPS SNR and air interface parameters for the U-TDOA measurements.

55. A system as recited in claim 53, further comprising means for performing computation of a weight ($W_{ai}$) as an inverse function of the RMS error squared, $$W_{ai} = \frac{1}{aTDOA_{rms\_i}^2 + \sigma_{M\_i}^2}.$$

56. A system as recited in claim 53, wherein said process for weighting pseudorange measurements further comprises means for scaling the theoretical weighting measurement data.

57. A system as recited in claim 50, wherein said process for weighting pseudorange measurements employs a database of GPS baseline measurement errors and a database of U-TDOA measurement errors compiled from past GPS and U-TDOA location measurements.

58. A system as recited in claim 57, wherein said process for weighting pseudorange measurements employs a coarse scaling factor ($S_c$), wherein said coarse scaling factor, $S_c$, represents a ratio of RMS error averaged over said GPS baseline measurement errors and said U-TDOA measurement errors.

59. A system as recited in claim 58, wherein said coarse scaling factor, $S_c$, is defined as $$S_c = \frac{UTDOA_{rms}^2}{GTDOA_{rms}^2}$$

where $GTDOA_{rms}$ represents the measured GPS RMS error and $UTDOA_{rms}$ represents the measured U-TDOA RMS error.

60. A system as recited in claim 59, wherein said process for weighting pseudorange measurements assigns, as an initial weighting for each GPS baseline, a product of the coarse scaling factor and the weight from the theoretical GPS TDOA.

61. A system as recited in claim 60, wherein said product assigned as an initial weighting is defined as $$W_{gi} = \frac{UTDOA_{rms}^2}{GTDOA_{rms}^2} \frac{1}{aTDOA_{rms\_i}^2} = S_c W_{ai}.$$

62. A system as recited in claim 57, wherein said process for weighting pseudorange measurements employs a fine scale factor ($S_f$) computed using hybrid GPS/U-TDOA measurements.

63. A system as recited in claim 62, wherein said fine scale factor is employed to derive a final measurement weight as follows:

$$W_{Gi} = SW_{ai}$$

where $S = S_f S_c$.

64. A system as recited in claim 38, further comprising means for employing a hybrid weighted least squares algorithm, said algorithm providing an analytical solution for biases in the GPS and U-TDOA contributions, including performing transformation of GPS pseudorange contributions and combining the transformed and weighted GPS contributions with computed GPS TDOA values obtained from the pseudorange measurements.

65. A system as recited in claim 64, wherein said hybrid weighted least squares algorithm further comprises performing a three-dimensional search for GPS baselines.

66. A system as recited in claim 65, wherein said hybrid weighted least squares algorithm further comprises the computation of TDOA values assuming test locations of the mobile device and searching until a prescribed stopping condition is met, including computing chi-square metrics and summing said metrics for each test location.

67. A system as recited in claim 66, wherein said hybrid weighted least squares algorithm further comprises computation of a combined chi-square metric including separate bias values for GPS and U-TDOA.

68. A system as recited in claim 67, wherein said hybrid weighted least squares algorithm further comprises determining a minimum chi square metric and corresponding test location, wherein the stopping condition is deemed to be met when the minimum is found at a predetermined highest resolution.

69. A system as recited in claim 66, further comprising means for performing a U-TDOA search in three dimensions, said U-TDOA search comprising first searching transformed GPS UTDOA baselines for a minimum chi square metric over all GPS baselines in two dimensions (x, y) and then employing a z-search algorithm to search in a third dimension (z).

70. A system as recited in claim 66, wherein a prescribed stopping condition includes a continuation of the search at the current resolution when the minimum location solution falls on the edge of the search space.

71. A system as recited in claim 66, wherein a prescribed stopping condition includes a continuation of the search at the current map resolution when the minimum location solution falls on the edge of the search space.

72. A system as recited in claim 69, wherein said z-search algorithm comprises the use of an initial estimation of the mobile device's altitude, a coarse search, a fine search, and steering criteria.

73. A system as recited in claim 72, wherein said z-search algorithm further comprises finding an initial search position in the z-dimension with respect to a UTDOA coordinate system; wherein said coarse search comprises computing and using an initial estimate, Zo, representing the position of the mobile device at a typical height above ground level; wherein said steering criteria includes selecting the coarse search for resolutions below a predetermined resolution threshold, and performing the fine search once the resolution threshold is reached.

74. A computer readable medium containing computer readable instructions for carrying out the following computer-implemented method for use in locating a mobile device:
communicating with a mobile device and obtaining from said mobile device pseudorange measurements based on signals received by said mobile device from one or more satellites, wherein said one or more satellites are satellites of at least one of a Global Navigation Satellite System (GNSS) or Global Positioning System (GPS);
computing GPS time difference of arrival (G-TDOA) values based on the GPS pseudorange measurements, said G-TDOA values representing baselines between the mobile device and the GPS/GNSS satellites;
obtaining an uplink time difference of arrival (U-TDOA) measurement representing a first baseline between first and second terrestrial receivers;
providing hybrid GPS/U-TDOA baselines;
computing weightings for the hybrid GPS/U-TDOA baselines, wherein the step of computing weightings comprises an iterative downweighting method including determining a hybrid position estimate using a current baseline weighting, and then downweighting the U-TDOA baselines and G-TDOA baselines, until either a first or second prescribed stopping condition is met; and
estimating the location of the mobile device using the hybrid GPS/U-TDOA baselines and the weightings.

* * * * *